US008824735B2

(12) United States Patent
Pham

(10) Patent No.: US 8,824,735 B2
(45) Date of Patent: Sep. 2, 2014

(54) MULTI-HYPOTHESIS PROJECTION-BASED SHIFT ESTIMATION

(75) Inventor: Tuan Quang Pham, Epping (AU)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 13/559,382

(22) Filed: Jul. 26, 2012

(65) Prior Publication Data

US 2013/0028472 A1 Jan. 31, 2013

(30) Foreign Application Priority Data

Jul. 29, 2011 (AU) ................................ 2011205087

(51) Int. Cl.
*G06K 9/00* (2006.01)
*G06T 7/00* (2006.01)
*H04N 5/228* (2006.01)
*H04N 5/232* (2006.01)

(52) U.S. Cl.
CPC ..... *G06T 7/0026* (2013.01); *G06T 2207/20068* (2013.01); *H04N 5/23254* (2013.01); *H04N 5/23267* (2013.01); *H04N 5/23238* (2013.01); *G06T 2207/20016* (2013.01)
USPC ........................ 382/103; 382/250; 348/208.13

(58) Field of Classification Search
CPC .................................. G06K 9/00; H04N 5/228
USPC ......... 382/100, 103, 106–107, 155, 162, 168, 382/173, 181, 206, 209, 232, 240, 250, 254, 382/274, 276, 284–285, 305, 312; 374/19; 348/208.13
See application file for complete search history.

(56) References Cited

U.S. PATENT DOCUMENTS

| 7,751,591 | B2* | 7/2010 | Bober et al. | 382/107 |
| 7,794,042 | B2* | 9/2010 | Mizes et al. | 347/19 |
| 8,068,693 | B2* | 11/2011 | Sorek et al. | 382/284 |
| 2009/0022422 | A1* | 1/2009 | Sorek et al. | 382/284 |
| 2010/0172586 | A1* | 7/2010 | Sorek et al. | 382/181 |

OTHER PUBLICATIONS

A. Adams; N. Gelfand; K. Pulli. Viewfinder Alignment. Computer Graphics Forum 2008,vol. 27.
Richard Szeliski; "Image Alignment and Stitching: A Tutorial";Foundations and Trends in Computer Graphics and Vision, vol. 2, No. 1 (2006) p. 1-104.
A. Adams; N. Gelfand; K. Pulli. Viewfinder Alignment. Computer Graphics Forum 2008, vol. 27.
Richard Szeliski; "Image Alignment and Stitching: A Tutorial"; Foundations and Trends in Computer Graphics and Vision, vol. 2, No. 1 (2006) pp. 1-104.

* cited by examiner

*Primary Examiner* — Seyed Azarian
(74) *Attorney, Agent, or Firm* — Canon U.S.A., Inc. IP Division

(57) ABSTRACT

A method for determining a shift between two images, determining a first correlation in a first direction, the first correlation being derived from a first image projection characteristics and a second image projection characteristics, and a second correlation in a second direction, the second correlation being derived from the first image projection characteristics and the second image projection characteristics. The method determines a set of hypotheses from a first plurality of local maxima of the first correlation and a second plurality of local maxima of the second correlation. The method then calculates a two-dimensional correlation score between the first image and the second image based on a shift indicated in at least one of the set of hypotheses, and selecting one of the set of hypotheses as the shift between the first image and the second image based on the calculated two-dimensional correlation score.

21 Claims, 15 Drawing Sheets

Brightness difference between image1 and image2

Panoramic image

MULTI-HYPOTHESIS PROJECTION-BASED SHIFT ESTIMATION

This application claims priority from Australian Patent Application No. 2011-205087 filed Jul. 29, 2011, which is hereby incorporated by reference herein in its entirety.

TECHNICAL FIELD

The present disclosure relates to global alignment between two images and, in particular, to determining a translation from one image to another image.

BACKGROUND

An image is made up of visual elements, wherein a visual element is defined as a region in an image sample. The image sample may be a complete image frame captured by a camera or any portion of such an image frame. In one arrangement, a visual element is an 8 by 8 block of Discrete Cosine Transform (DCT) coefficients, as acquired by decoding a motion-JPEG frame. In other arrangements, a visual element may be implemented as, for example: a pixel, such as a Red-Green-Blue (RGB) pixel; a group of pixels; or a block of transform coefficients, such as Discrete Wavelet Transformation (DWT) coefficients as used in the JPEG-2000 standard. Global alignment is the process of determining the correspondence between visual elements in a pair of images that have common subject matter. The alignment is also referred to as shift. The terms 'shift' and 'alignment' are used interchangeably throughout this specification to describe a translation between two images.

Global alignment involves determining the parameters of a translation from one image to another image. Global alignment is an important task for many imaging applications, such as image quality measurement, video stabilisation, and moving object detection. For applications executed on embedded devices, the alignment needs to be both accurate and fast. Given the alignment between consecutive frames from a panning camera, a panoramic image can be constructed during image capturing. Overlapping images are stitched along a seam that is selected to avoid cutting through moving objects, as well as minimising the intensity mismatch of the images on either side of the seam.

A correlation-based global alignment approach has good robustness against difficult imaging conditions, such as low light, camera motion blur, or motion in the scene. However, the computational expense of the correlation-based global alignment approach is high.

A Fast Fourier Transform (FFT) based two dimensional (2D) correlation approach applies a Fast Fourier Transform (FFT) on images and computes 2D phase correlation. This approach requires $O(N^2 \log N^2)$ computations for $N \times N$ pixel images. The computational complexity can be reduced to $O(N \log N)$, if the correlation is performed on one dimensional (1D) image projections only. This approach is suitable for images with strong gradient structures along the projection axes. Most indoor and natural landscape scenes contain enough horizontal and vertical details for this purpose.

A projection-based correlation approach uses projections of the gradient energy along four directions 0°, 45°, 90°, and 135°. Gradient energy is the sum of the square of the gradient on a horizontal and a vertical axis. The projection of the gradient energy along one angle is the sum of the gradient energy along the angle. The use of gradient energy rather than intensity improves the alignment robustness under local lighting changes. This approach is used for viewfinder alignment, in which motion is restricted to a small translation, such as less than 10% of the frame, and a small rotation, such as less than 1°. The approach is not suitable in the case of larger translations (or occlusions) and rotations.

For panoramic image construction, one approach is to use camera calibration, pairwise 2D projective alignment, bundle adjustment, deghosting, feathering blend, and cylindrical coordinate mapping. However, this approach is typically too complex and computationally too expensive for embedded devices or for cloud computing applications where a large number of images need to be processed simultaneously.

Other approaches use low cost sweep panorama functionality, but result in low quality panorama images, due to artefacts such as ghosting and truncation of moving objects.

Despite having a speed advantage, previous projection-based alignment algorithms have a number of limitations. First, the image pair must have a substantial overlap (more than 90% of the frame area) for the alignment to work. This is because the image data from non-overlapping areas adds perturbation to the projections, eventually breaking their correlation. Second, previous gradient projection methods are not robust to low lighting conditions. The low energy but dense gradient of dark current noise often overpowers the stronger but sparse gradient of the scene structures when integrated over a whole image row or column. For a similar reason, gradient projection methods are also not robust against a highly textured scene like carpet or foliage. Finally, heavy JPEG compression creates strong blocking artefacts that bias the shift estimation towards the DCT (Discrete Cosine Transform) grid points.

Thus, a need exists to provide an improved method and system for determining a shift between a first image and a second image.

SUMMARY

It is an object of the present invention to overcome substantially, or at least ameliorate, one or more disadvantages of existing arrangements.

According to a first aspect of the present disclosure, there is provided a method for determining a shift between a first image and a second image, the first image having first image projection characteristics and the second image having second image projection characteristics. The method comprises the steps of: determining a first correlation in a first direction, the first correlation being derived from the first image projection characteristics in the first direction and the second image projection characteristics in the first direction; determining a second correlation in a second direction, the second correlation being derived from the first image projection characteristics in the second direction and the second image projection characteristics in the second direction; identifying a first plurality of local maxima in the first correlation in the first direction; identifying a second plurality of local maxima in the second correlation in the second direction; determining a set of hypotheses, wherein each hypothesis in the set of hypotheses includes a local maximum of the first correlation and a local maximum of the second correlation; and determining the shift between the first image and the second image based upon the set of hypotheses.

Desirably the determining of the set of hypotheses involves each hypothesis in said set of hypotheses being a combination of one of the identified first plurality of local maxima and one of the identified second plurality of local maxima. The determining of the shift between the first image and the second image based upon the set of hypotheses may be performed by calculating a two-dimensional correlation score between the first image and the second image based on a shift indicated in at least one of the set of hypotheses and selecting one of the set of hypotheses as the shift between the first image and the second image based on the calculated two-dimensional correlation score.

According to a second aspect of the present disclosure, there is provided an image processing system comprising: a lens system; a sensor; a control module for controlling the lens system and the sensor to capture an image sequence of a scene; a storage device for storing a computer program; and a processor for executing the program. The program comprises: computer program code for determining a shift between a first image and a second image, the first image having first image projection characteristics and the second image having second image projection characteristics, the determining of the shift including the steps of:

determining a first correlation in a first direction, the first correlation being derived from the first image projection characteristics in the first direction and the second image projection characteristics in the first direction;

determining a second correlation in a second direction, the second correlation being derived from the first image projection characteristics in the second direction and the second image projection characteristics in the second direction;

identifying a first plurality of local maxima in the first correlation in the first direction;

identifying a second plurality of local maxima in the second correlation in the second direction;

determining a set of hypotheses, wherein each hypothesis in the set of hypotheses includes a local maximum of the first correlation and a local maximum of the second correlation; and determining the shift between the first image and the second image based upon the set of hypotheses.

According to a third aspect of the present disclosure, there is provided a computer readable storage medium having recorded thereon a computer program for determining a shift between a first image and a second image, the first image having first image projection characteristics and the second image having second image projection characteristics, the computer program comprising code for performing the steps of: determining a first correlation in a first direction, the first correlation being derived from the first image projection characteristics in the first direction and the second image projection characteristics in the first direction; determining a second correlation in a second direction, the second correlation being derived from the first image projection characteristics in the second direction and the second image projection characteristics in the second direction; identifying a first plurality of local maxima in the first correlation in the first direction; identifying a second plurality of local maxima in the second correlation in the second direction; determining a set of hypotheses, wherein each hypothesis in the set of hypotheses includes a local maximum of the first correlation and a local maximum of the second correlation; and determining the shift between the first image and the second image based upon the set of hypotheses.

According to a fourth aspect of the present disclosure, there is provided a method of determining a shift between a first image and a second image, the first image having first image projection characteristics and the second image having second image projection characteristics, the method comprising the steps of:

determining a first correlation in a first direction, the first correlation being derived from the first image projection characteristics in the first direction and the second image projection characteristics in the first direction;

determining a second correlation in a second direction, the second correlation being derived from the first image projection characteristics in the second direction and the second image projection characteristics in the second direction;

identifying a first plurality of local maxima in the first correlation in the first direction;

identifying a second plurality of local maxima in the second correlation in the second direction; and determining the shift between the first image and the second image by:

determining an hypothesis that satisfies a predetermined threshold, the hypothesis including a local maximum of the first correlation and a local maximum of the second correlation; and selecting the determined hypothesis as the shift between the first image and the second image.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the aforementioned methods.

Other aspects of the invention are also disclosed.

BRIEF DESCRIPTION OF THE DRAWINGS

One or more embodiments of the invention will now be described with reference to the following drawings, in which.

DETAILED DESCRIPTION

Figure 1A:
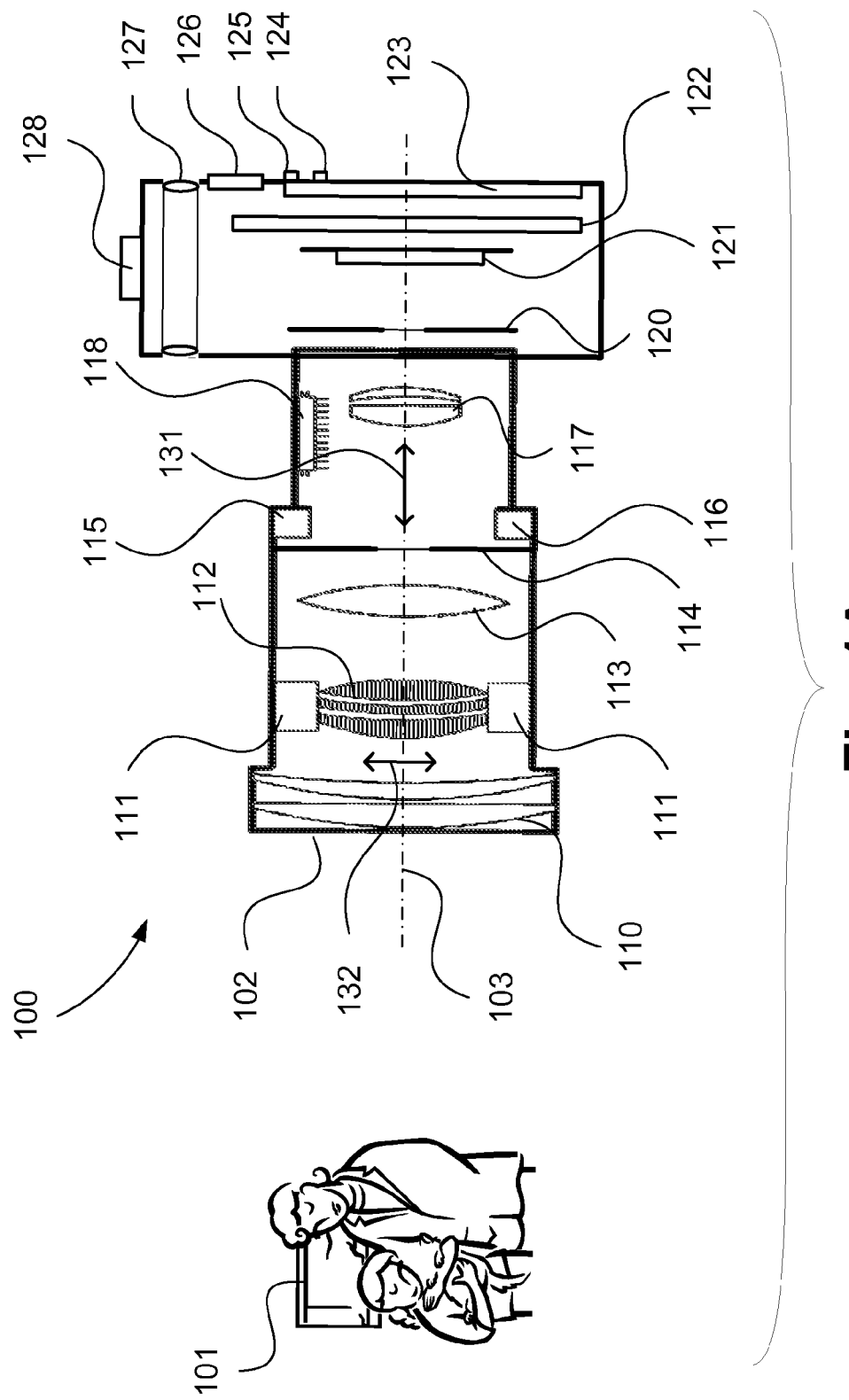
FIG. 1A is a cross-sectional schematic block diagram of an exemplary image capture system 100, upon which various arrangements described herein can be practised.

Where reference is made in any one or more of the accompanying drawings to steps and/or features that have the same reference numerals, those steps and/or features have for the purposes of this description the same function(s) or operation(s), unless the contrary intention appears.

Performing global alignment is an important task in image processing and has application in fields including image quality measurement, video stabilisation, and moving object detection. Global alignment determines a shift between portions of a first image and a second image, wherein the portions may include the entire images or any parts thereof. The first and second images may have been captured by a single camera or by different cameras. The first and second images may be captured simultaneously, or in successive or even consecutive frames of an image sequence, or after any period of time.

In one example, a person utilises a camera to capture an image sequence that includes a plurality of images of a scene, wherein the person pans the camera between each image to capture different, but overlapping, portions of the scene. The plurality of images can then be utilised to compose a panoramic image of the scene by stitching the images together in appropriate places. To determine the best places to stitch the images, it is useful to determine the shift between each pair of images in the image sequence. The shift between each pair of images may be caused by many variables, including, for example, the panning and tilting of the camera, and movement of the scene or objects being captured.

In another example, two images are captured by different cameras at different points of time. Determining that a shift between the two images is less than a predefined threshold provides a degree of confidence that the scene captured in the two images is the same scene.

The present disclosure provides a method and system for determining a shift between a first image and a second image, based on image projection characteristics of the respective first and second images. Projection characteristics may include, for example, the gradient magnitude, intensity, or DCT blocks, along a given projection axis. The method correlates the image projection characteristics of the respective first and second images in at least two directions and identifies a plurality of local maxima in each direction. In one embodiment, the first and second directions correspond to x-axis and y-axis projections. In another embodiment, the first and second directions correspond to projection axes at 45° and 135°, although the projection axes need not be orthogonal. The method determines a set of hypotheses, wherein each hypothesis includes a local maximum from the first direction and a local maximum from the second direction. The method identifies a best hypothesis from the set of hypotheses to assist in determining a shift between the first image and the second image.

One aspect of the present disclosure provides a method of determining a shift between a first image and a second image, the first image having first image projection characteristics and the second image having second image projection characteristics. The method determines a first correlation in a first direction, the first correlation being derived from the first image projection characteristics in the first direction and the second image projection characteristics in the first direction, and determines a second correlation in a second direction, the second correlation being derived from the first image projection characteristics in the second direction and the second image projection characteristics in the second direction. The method identifies a first plurality of local maxima in the first correlation in the first direction and a second plurality of local maxima in the second correlation in the second direction. The method determines a set of hypotheses, wherein each hypothesis in the set of hypotheses includes a local maximum of the first correlation and a local maximum of the second correlation, and determines the shift between the first image and the second image based upon the set of hypotheses.

In one or more embodiments, a mask is applied to a part of either one or both of the first image and the second image prior to determining projection characteristics of the first and second images, wherein the projection characteristics are determined on the remainder of the first image and the remainder of the second image.

In one or more embodiments, determining the shift between the first image and the second image based upon the set of hypotheses comprises the steps of: calculating a two-dimensional Normalised Cross-Correlation (2D NCC) score for each hypothesis in the set of hypotheses; and selecting the hypothesis with the highest 2D NCC score as the shift between the first and the second images. In one or more alternative embodiments, determining the shift between the first image and the second images utilises a Mean Squared Error (MYSE) between 2 aligned images and selects the hypothesis with the smallest MSE. In one or more further alternative embodiments, determining the shift between the first image and the second images is performed by measuring Mutual Information (MI) between 2 aligned images and selecting the hypothesis that maximises the MI. Other methods of determining the shift based upon the set of hypotheses may equally be practised.

The present disclosure also provides an image processing system including a lens system, a sensor, a control module for controlling the lens system and the sensor to capture an image sequence of a scene, a storage device for storing a computer program, and a processor for executing the program. The program includes computer program code for performing the steps of the method described above. The image processing system determines a shift between pairs of images and optionally utilises the determined shift to stitch a pair of images to produce a panoramic image.

In one implementation, the image processing system is a camera. In another implementation, the image processing system includes a camera and a computer module coupled to the camera. The camera includes each of the lens system, the sensor, and the control module. The computer module includes the storage device and the processor. The camera captures images and transmits the images to the computer module for processing to determine a shift between pairs of the images.

One implementation provides a camera embodying a system for determining a shift between a first image and a second image. The camera is able to construct a panoramic image by stitching together one or more pairs of images. The camera determines the shift between the images in each pair of images, determines an appropriate seam, and joins the images from each pair to construct a panoramic image.

An alternative implementation provides a computer system for performing image processing, wherein the computer system includes a system for determining a shift between a first image and a second image. The computer system performs image processing to determine a shift between a first image and a second image. The computer system can use the shift determined between a first image and a second image to construct a panoramic image from the first image and the second image. In one arrangement, multiple pairs of images are utilised to construct a panoramic image. In a further arrangement, the computer system is coupled to one or more cameras to process images received from the cameras. In another arrangement, the computer system receives image files from a memory storage unit.

One aspect of the present disclosure provides a method and system for performing separable shift estimation using one-dimensional (1D) projections of the absolute gradient images along the sampling axes. For each image dimension, multiple shift hypotheses are maintained to avoid misdetection due to non-purely translational motion or distractions from the non-overlapping areas. The final shift estimate is the one that produces the highest two-dimensional (2D) Normalized Cross-Correlation (NCC) score. Depending on the particular implementation, received input images are optionally subsampled prior to analysis to improve speed and noise robustness. Shift estimation is performed over multiple scales to reduce the contribution of texture in the gradient projections, wherein each scale is a different subsampling of the input image. Depending on the application, the images are optionally cropped to improve overlap before gradient projection.

Given the alignment between consecutive frames from a panning camera, a panoramic image can be constructed during image capturing or in image post-processing. Overlapping images are stitched along an irregular seam that avoids cutting through moving objects. This seam also minimises the intensity mismatch of the images on either side of the seam. The fast seam detection algorithm uses a greedy grey-weighted distance transform.

One embodiment utilises multi-scale blending using the Laplacian pyramids of both input images to reduce any remaining intensity mismatch after stitching. This approach decomposes each input image to a Laplacian pyramid, and performs the seam stitching on a Laplacian image pair at each scale independently. This forms a composite Laplacian pyramid, from which the output image is reconstructed.

Figure 10:
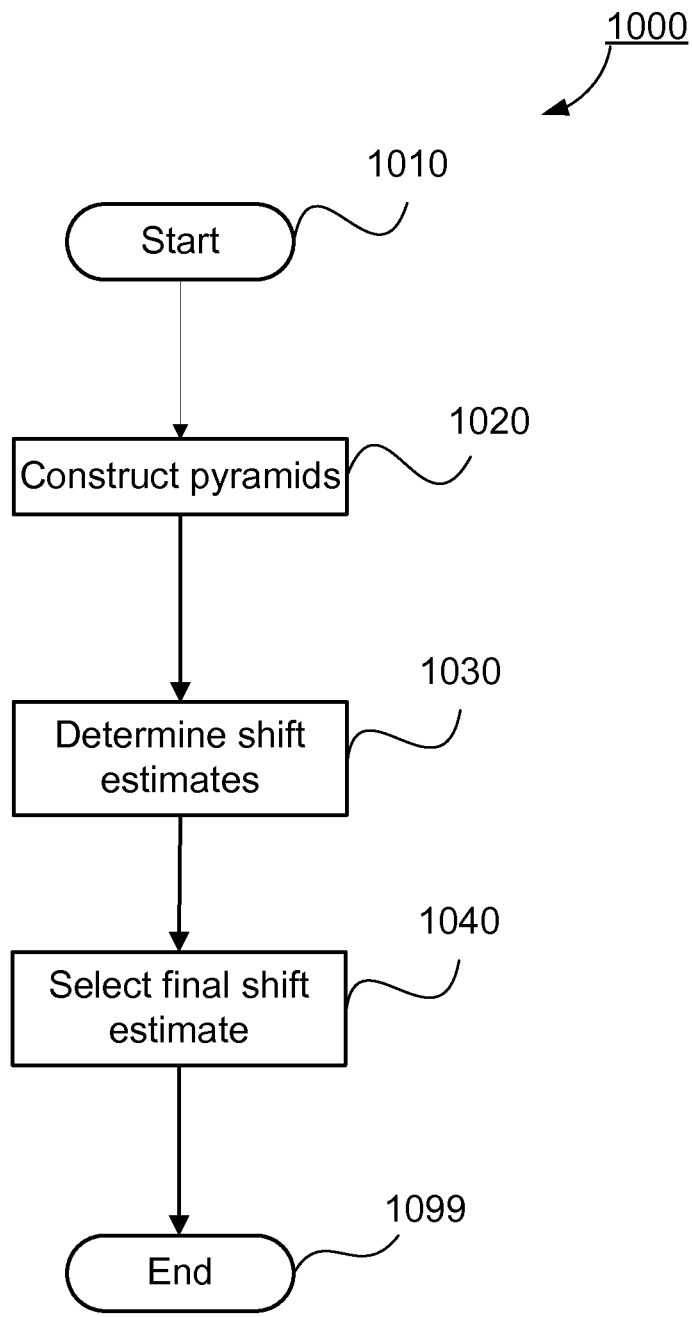
FIG. 10 is a flow diagram illustrating a method for determining a shift between a first image and a second image.

FIG. 10 is a flow diagram illustrating a method 1000 for determining a shift between a first image and a second image. The method 1000 begins at a start step 1010, wherein the processor 150 receives the first image and the second image. In one example, the first image and second image are retrieved from a memory storage unit, such as a database. In an alternative example, the first image and second image are received from one or more cameras that have captured the first and second images. Control passes from step 1010 to step 1020, which constructs a pyramid for each of the first image and the second image.

The method utilises the first image at an initial resolution as the base of a first pyramid and then subsamples the first image to create a lower resolution representation of the first image as a next layer of the first pyramid. This process successively subsamples each layer to form the next layer of the first pyramid. Thus, the first pyramid includes a stack of successively smaller images, with each visual element in a layer of the first pyramid containing a local average that corresponds to a pixel neighbourhood on a lower level of the first pyramid. A similar process creates a second pyramid based on the second image. In the basic case, the pyramid for each of the first and second images includes a single layer comprised of the first and second images at the original resolution or after a single subsampling. Subsampling may be required to convert the first and second images to a more manageable size for processing efficiency.

Control passes from step 1020 to step 1030, wherein the processor 150 determines a shift estimate for each layer of the pyramids. Step 1030 determines a separate set of hypotheses for each layer of the pyramids, identifies a best shift for each layer from the is respective set of hypotheses for that layer, and selects a best shift for the entire pyramid across the different layers.

The shift estimate is determined based on projection characteristics of the first and second images in first and second directions. Projection characteristics of the first and second images in the first and second directions are correlated for each layer of the pyramids. The method determines a set of hypotheses and selects the shift estimate from the set of hypotheses. Each hypothesis in the set of hypotheses generally includes a local maximum from a correlation of the projection characteristics in the first direction and a local maximum of the projection characteristics in the second direction. Each hypothesis is an estimate of the shift between the first image and the second image. In one implementation, the set of hypotheses includes each possible permutation of a local maximum of the correlation in the first direction and a local maximum of the correlation in the second direction. In another implementation each hypothesis in the set of hypotheses is a combination of one of the identified first plurality of local maxima and one of the identified second plurality of local maxima. An alternative implementation iteratively selects permutations of a local maximum of the correlation in the first direction and a local maximum of the correlation in the second direction as a present hypothesis. The present hypothesis is compared to a predetermined threshold or criteria. If the present hypothesis satisfies the predetermined threshold or criteria, then the present hypothesis is determined to be the shift between the first image and the second image. In another implementation each hypothesis in the set of hypotheses is a combination of one of the identified first plurality of local maxima and one of the identified second plurality of local maxima.

Control passes to step 1040, wherein the processor 150 selects one of the shift estimates as a final shift estimate, based on predefined criteria. In one example, the processor 150 calculates a two-dimensional correlation score between the first image and the second image based on a shift indicated in at least one of the set of hypotheses, and selects one of the set of hypotheses as the shift between the first image and the second image based on the calculated two-dimensional correlation score. In another example, the best shift estimate is the hypothesis with a highest two-dimensional Normalised Cross-Correlation (2D NCC) score. Control passes from step 1040 to an End step 1099 and the method 1000 terminates.

System Implementation

FIG. 1A is a cross-sectional schematic block diagram of an exemplary image capture system 100, upon which various arrangements described herein can be practised. In the general case, the image capture system 100 is a digital still camera or a digital video camera (also referred to as a camcorder).

As seen in FIG. 1A, the camera system 100 comprises an optical system 102 which receives light from a scene 101 and forms an image on a sensor 121. The sensor 121 comprises a 2D array of pixel sensors which measure the intensity of the image formed on the array by the optical system 102 as a function of position. The operation of the camera 100, including user interaction and aspects of reading, processing, and storing image data from the sensor 121 is coordinated by a main controller 122, which comprises a special purpose computer system. This system is considered in detail below.

The user is able to communicate with the controller 122 via a user interface. In the example of FIG. 1, the user interface is implemented using a set of buttons including a shutter release button 128, used to initiate focus and capture of image data, and other general and special purpose buttons 124, 125, 126 which may provide direct control over specific camera functions, such as flash operation or support interaction with a graphical user interface presented on a display device 123. The display device may also have a touch screen capability to further facilitate user interaction. It is possible to control or modify the behaviour of the camera by using the buttons and controls. Typically, it is possible to control capture settings such as the priority of shutter speed or aperture size when achieving a required exposure level, or the area used for light metering, use of flash, ISO speed, options for automatic focusing, and many other photographic control functions. Further, it is possible to control processing options such as the colour balance or compression quality. The display 123 is typically also used to review the captured image or video data. It is common for a still image camera to use the display to provide a live preview of the scene, thereby providing an alternative to an optical viewfinder 127 for composing prior to still image capture and during video capture.

The optical system comprises an arrangement of lens groups 110, 112, 113 and 117, which can be moved relative to each other along a line 131 parallel to an optical axis 103 under control of a lens controller 118 to achieve a range of magnification levels and focus distances for the image formed at the sensor 121. The lens controller 118 may also control a mechanism 111 to vary the position, on any line 132 in the plane perpendicular to the optical axis 103, of a corrective lens group 112, in response to input from one or more motion sensors 115, 116 or the controller 122 so as to shift the position of the image formed by the optical system on the sensor. Typically, the corrective optical element 112 is used to effect an optical image stabilisation by correcting the image position on the sensor for small movements of the camera, such as those caused by hand-shake. The optical system may further comprise an adjustable aperture 114 and a shutter mechanism 120 for restricting the passage of light through the optical system. Although both the aperture and shutter are typically implemented as mechanical devices, the aperture and shutter may also be constructed using materials, such as liquid crystal, whose optical properties can be modified under the control of an electrical control signal. Such electro-optical devices have the advantage of allowing both shape and the opacity of the aperture to be varied continuously under control of the controller 122.

Figure 1B:
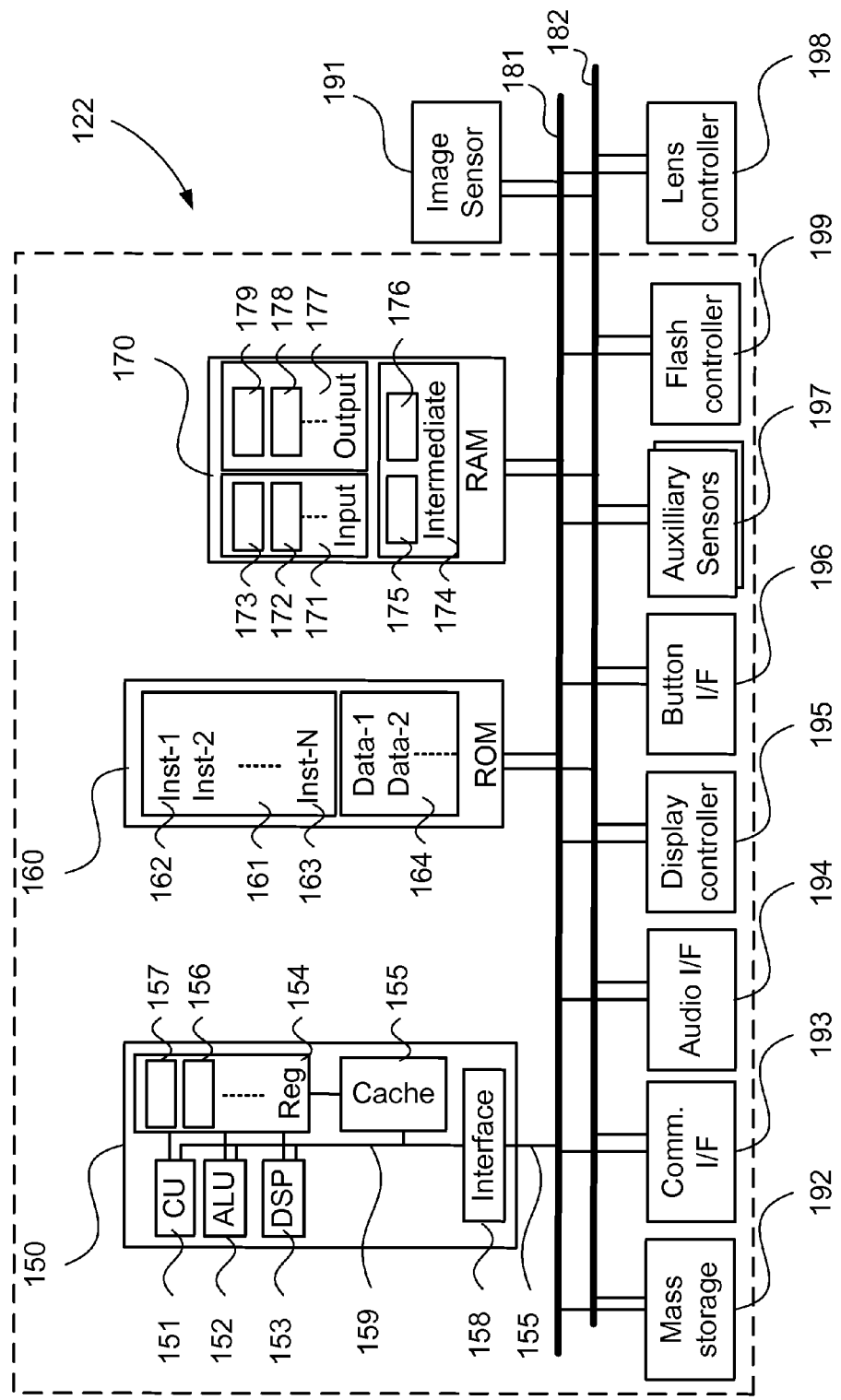
FIG. 1B is a schematic block diagram for the controller 122 of FIG. 1A, in which other components of the camera system 100 which communicate with the controller 122 are depicted as functional blocks.

FIG. 1B is a schematic block diagram for the controller 122 of FIG. 1A, in which other components of the camera system 100 which communicate with the controller 122 are depicted as functional blocks. In particular, the image sensor 191 and lens controller 198 are depicted without reference to their physical organisation or the image forming process and are treated only as devices which perform specific pre-defined tasks and to which data and control signals can be passed. FIG. 1B also depicts a flash controller 199, which is responsible for operation of a strobe light that can be used during image capture in low light conditions as auxiliary sensors 197 which may form part of the camera system 100. Auxiliary sensors may include: orientation sensors that detect if the camera is in a landscape or portrait orientation during image capture; motion sensors that detect movement of the camera; other sensors that detect the colour of the ambient illumination or assist with autofocus and so on. Although the flash controller 199 and the auxiliary sensors 197 are depicted as part of the controller 122, the flash controller 199 and the auxiliary sensors 197 may in some implementations be implemented as separate components within the camera system 100.

The controller 122 comprises a processing unit 150 for executing program code, Read Only Memory (ROM) 160, and Random Access Memory (RAM) 170, as well as non-volatile mass data storage 192. In addition, at least one communications interface 193 is provided for communication with other electronic devices, such as printers, displays, and general purpose computers. Examples of communication interfaces include USB, IEEE1394, HDMI, and Ethernet. An audio interface 194 comprises one or more microphones and speakers for capture and playback of digital audio data. A display controller 195 and button interface 196 are also provided to interface the controller to the physical display and controls present on the camera body. The components are interconnected by a data bus 181 and control bus 182.

In a capture mode, the controller 122 operates to read data from the image sensor 191 and audio interface 194 and manipulate that data to form a digital representation of the scene that can be stored to a non-volatile mass data storage 192. In the case of a still image camera, image data may be stored using a standard image file format such as JPEG or TIFF, or alternatively image data may be encoded using a proprietary raw data format that is designed for use with a complimentary software product that would provide conversion of the raw format data into a standard image file format. Such software would typically be run on a general purpose computer. For a video camera, the sequences of images that comprise the captured video are stored using a standard format such as DV, MPEG, or H.264. Some of these formats are organised into files such as AVI or Quicktime, referred to as container files, while other formats such as DV, which are commonly used with tape storage, are written as a data stream. The non-volatile mass data storage 192 is used to store the image or video data captured by the camera system and has a large number of realisations including, but not limited to, removable flash memory, such as a compact flash (CF) or secure digital (SD) card, memory stick, multimedia card, miniSD or microSD card, optical storage media such as writable CD, DVD or Blu-ray disk, or magnetic media such as magnetic tape or hard disk drive (HDD) including very small form-factor HDDs such as microdrives. The choice of mass storage depends on the capacity, speed, usability, power and physical size requirements of the particular camera system.

In a playback or preview mode, the controller 122 operates to read data from the mass storage 192 and present that data using the display 195 and audio interface 194.

The processor 150 is able to execute programs stored in one or both of the connected memories 160 and 170. When the camera system 100 is initially powered up, system program code 161, resident in ROM memory 160, executes. This system program code 161 permanently stored in ROM of the camera system is sometimes referred to as firmware. Execution of the firmware by the processor fulfils various high level functions, including processor management, memory management, device management, storage management, and user interface.

The processor 150 includes a number of functional modules including a control unit (CU) 151, an arithmetic logic unit (ALU) 152, a digital signal processing engine (DSP) 153 and a local or internal memory comprising a set of registers 154, which typically contain atomic data elements 156, 157, along with internal buffer or cache memory 155. One or more internal buses 159 interconnect these functional modules. The processor 150 typically also has one or more interfaces 158 for communicating with external devices via the system data 181 and control 182 buses using a connection 155.

The system program code 161 includes a sequence of instructions 162 through 163 that may include conditional branch and loop instructions. The program 161 may also include data which is used in execution of the program. This data may be stored as part of the instruction or stored in a separate location 164 within the ROM 160 or RAM 170.

In general, the processor 150 is given a set of instructions which are executed therein. This set of instructions may be organised into blocks which perform specific tasks or handle specific events that occur in the camera system. Typically, the system program will wait for events and subsequently execute the block of code associated with that event. This may involve setting into operation separate threads of execution running on independent processors in the camera system such as the lens controller 198 that will subsequently execute in parallel with the program running on the processor. Events may be triggered in response to input from a user as detected by the button interface 196. Events may also be triggered in response to other sensors and interfaces in the camera system.

The execution of a set of the instructions may require numeric variables to be read and modified. Such numeric variables are stored in RAM 170. The disclosed method uses input variables 171, which are stored in known locations 172, 173 in the memory 170. The input variables are processed to produce output variables 177, which are stored in known locations 178, 179 in the memory 170. Intermediate variables 174 may be stored in additional memory locations in locations 175, 176 of the memory 170. Alternatively, some intermediate variables may only exist in the registers 154 of the processor 150.

The execution of a sequence of instructions is achieved in the processor 150 by repeated application of a fetch-execute cycle. The Control unit 151 of the processor maintains a register called the program counter which contains the address in memory 160 of the next instruction to be executed. At the start of the fetch execute cycle, the content of the memory address indexed by the program counter is loaded into the control unit. The instruction thus loaded controls the subsequent operation of the processor, causing for example, data to be loaded from memory into processor registers, the contents of a register to be arithmetically combined with the contents of another register, the contents of a register to be written to the location stored in another register and so on. At the end of the fetch execute cycle, the program counter is updated to point to the next instruction in the program. Depending on the instruction just executed, updating the program counter may involve incrementing the address contained in the program counter or loading the program counter with a new address in order to achieve a branch operation.

Each step or sub-process in the processes of flow charts are associated with one or more segments of the program 161, and is performed by repeated execution of a fetch-execute cycle in the processor 110 or similar programmatic operation of other independent processor blocks in the camera system.

In one arrangement, the ROM 160 stores a computer program which includes instructions for performing the method described herein for estimating a global alignment between two images, wherein at least a portion of the two images falls within a field of view of the camera 100. The computer program is executed by the processor 150. The disclosed arrangement for estimating global alignment uses input variables 171, which are stored in the memory 170 in corresponding memory locations 171 and 172. The arrangement for estimating global alignment produces output variables 177, which are stored in the memory 170 in corresponding locations 178 and 179.

Figure 9A:
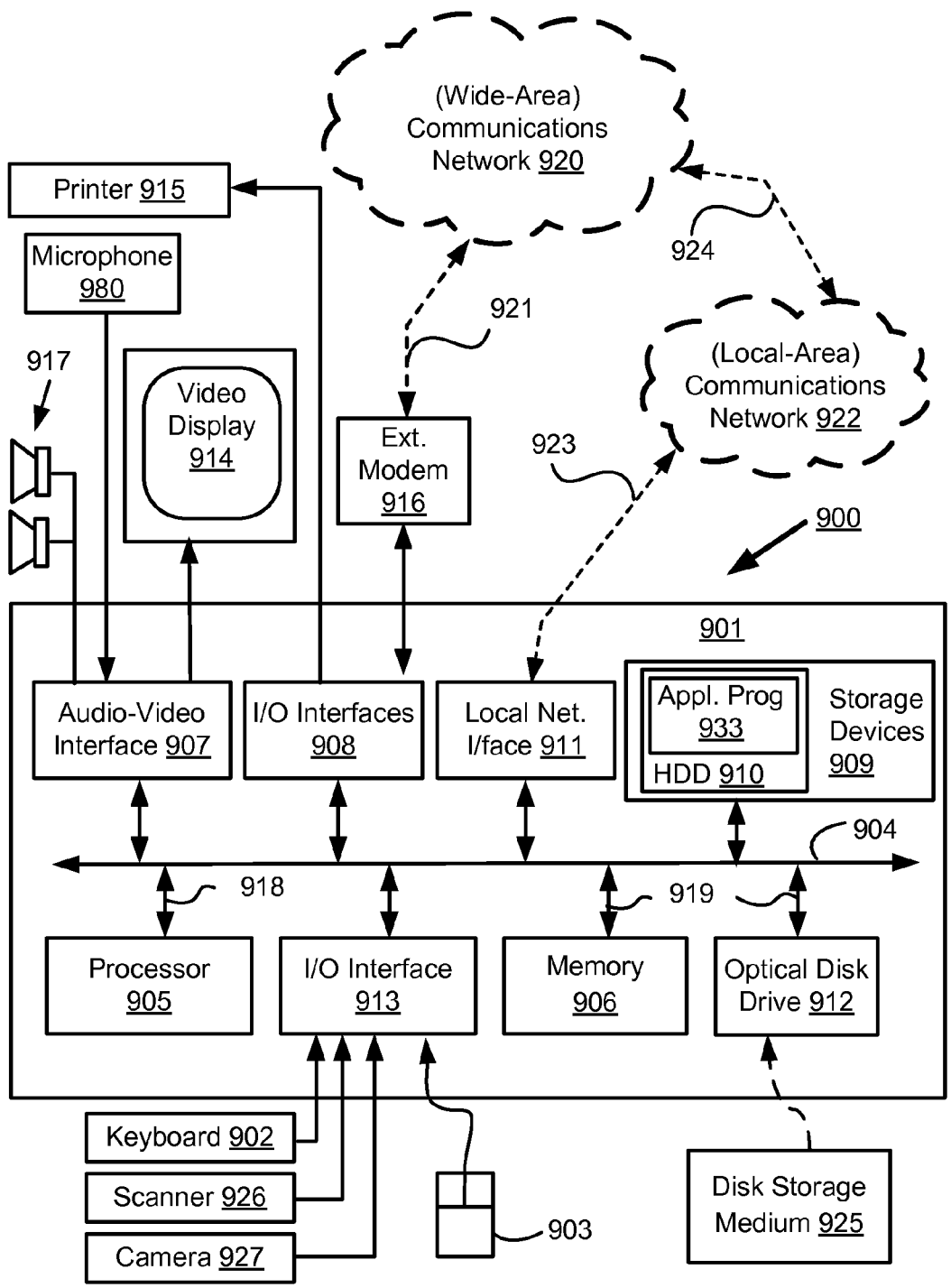
FIGS. 9A and 9B form a schematic block diagram of a general purpose computer system upon which arrangements described can be practised.
Figure 9B:
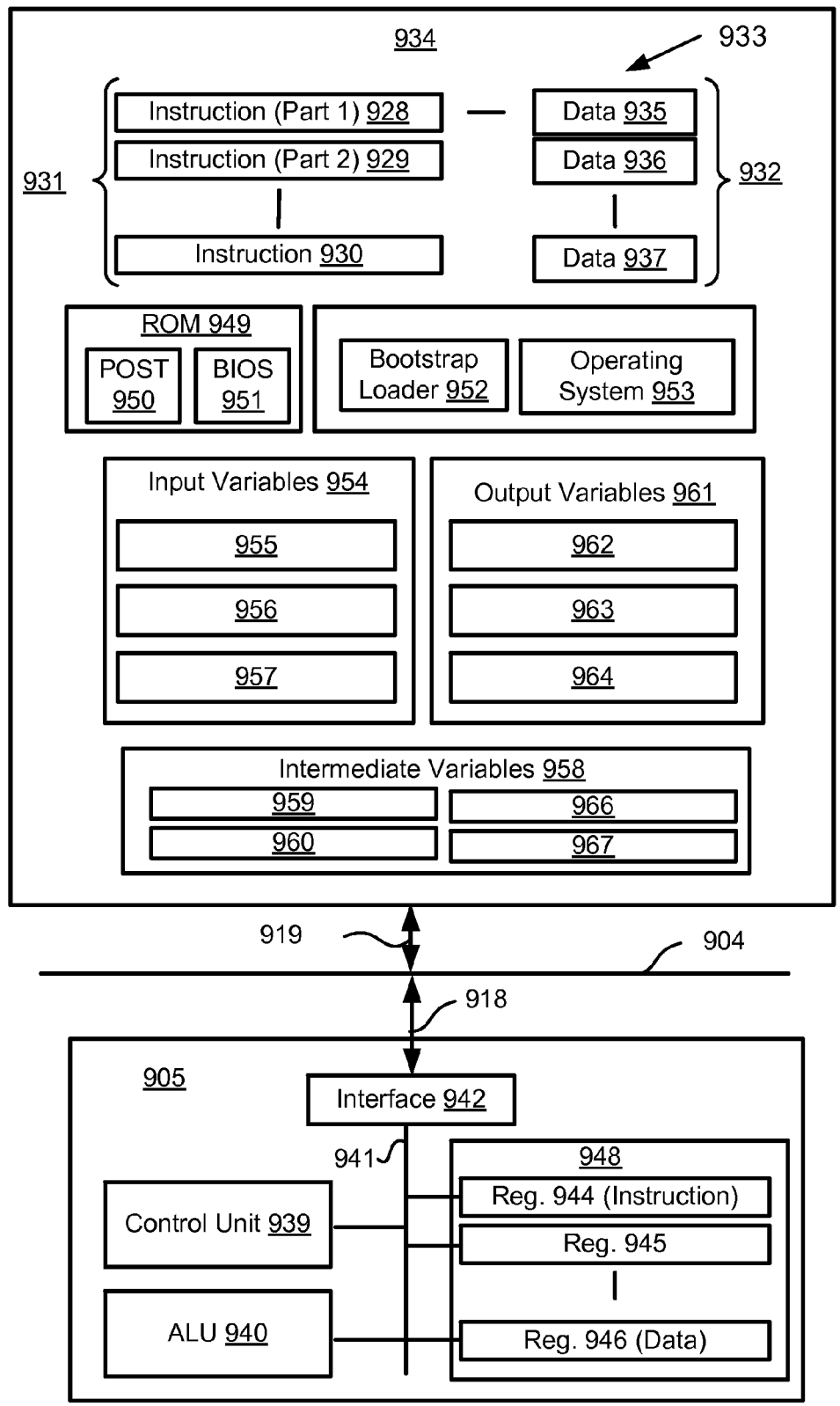

FIGS. 9A and 9B depict a general-purpose computer system 900, upon which the various arrangements described can be practised.

As seen in FIG. 9A, the computer system 900 includes: a computer module 901; input devices such as a keyboard 902, a mouse pointer device 903, a scanner 926, a camera 927, and a microphone 980; and output devices including a printer 915, a display device 914 and loudspeakers 917. An external Modulator-Demodulator (Modem) transceiver device 916 may be used by the computer module 901 for communicating to and from a communications network 920 via a connection 921. The communications network 920 may be a wide-area network (WAN), such as the Internet, a cellular telecommunications network, or a private WAN. Where the connection 921 is a telephone line, the modem 916 may be a traditional "dial-up" modem. Alternatively, where the connection 921 is a high capacity (e.g., cable) connection, the modem 916 may be a broadband modem. A wireless modem may also be used for wireless connection to the communications network 920.

The computer module 901 typically includes at least one processor unit 905, and a memory unit 906. For example, the memory unit 906 may have semiconductor random access memory (RAM) and semiconductor read only memory (ROM). The computer module 901 also includes an number of input/output (I/O) interfaces including: an audio-video interface 907 that couples to the video display 914, loudspeakers 917, and microphone 980; an I/O interface 913 that couples to the keyboard 902, mouse 903, scanner 926, camera 927 and optionally a joystick or other human interface device (not illustrated); and an interface 908 for the external modem 916 and printer 915. In some implementations, the modem 916 may be incorporated within the computer module 901, for example within the interface 908. The computer module 901 also has a local network interface 911, which permits coupling of the computer system 900 via a connection 923 to a local-area communications network 922, known as a Local Area Network (LAN). As illustrated in FIG. 9A, the local communications network 922 may also couple to the wide network 920 via a connection 924, which would typically include a so-called "firewall" device or device of similar functionality. The local network interface 911 may comprise an Ethernet™ circuit card, a Bluetooth™ wireless arrangement, or an IEEE 802.11 wireless arrangement; however, numerous other types of interfaces may be practised for the interface 911.

The I/O interfaces 908 and 913 may afford either or both of serial and parallel connectivity, the former typically being implemented according to the Universal Serial Bus (USB) standards and having corresponding USB connectors (not illustrated). Storage devices 909 are provided and typically include a hard disk drive (HDD) 910. Other storage devices such as a floppy disk drive and a magnetic tape drive (not illustrated) may also be used. An optical disk drive 912 is typically provided to act as a non-volatile source of data. Portable memory devices, such optical disks (e.g., CD-ROM, DVD, Blu-ray Disc™) USB-RAM, portable, external hard drives, and floppy disks, for example, may be used as appropriate sources of data to the system 900.

The components 905 to 913 of the computer module 901 typically communicate via an interconnected bus 904 and in a manner that results in a conventional mode of operation of the computer system 900 known to those in the relevant art. For example, the processor 905 is coupled to the system bus 904 using a connection 918. Likewise, the memory 906 and optical disk drive 912 are coupled to the system bus 904 by connections 919. Examples of computers on which the described arrangements can be practised include IBM-PCs and compatibles, Sun Sparcstations, Apple Mac™, or like computer systems.

The method of determining a shift between a first image and a second image may be implemented using the computer system 900, wherein the processes of FIGS. 2 to 8 and 10 to 12, described herein, may be implemented as one or more software application programs 933 executable within the computer system 900. In particular, the steps of the method of determining a shift between a first image and a second image are effected by instructions 931 (see FIG. 9B) in the software 933 that are carried out within the computer system 900. The software instructions 931 may be formed as one or more code modules, each for performing one or more particular tasks. The software may also be divided into two separate parts, in which a first part and the corresponding code modules perform the correlation, hypothesis construction, shift estimation, seam determination, and panoramic image construction methods and a second part and the corresponding code modules manage a user interface between the first part and the user.

In one example, the images on which shift estimation is performed are captured by the camera 927 and passed to the computer module 901 for processing. In another example, the images on which shift estimation is performed are retrieved from storage, such as the disk storage medium 925, one of the storage devices 909, or any combination thereof. In a further embodiment, one or more of the images on which shift estimation is performed are received by the computer module 901 by a communications link, such as one of the communications networks 920, 922.

The software may be stored in a computer readable medium, including the storage devices described below, for example. The software is loaded into the computer system 900 from the computer readable medium, and then executed by the computer system 900. A computer readable medium having such software or computer program recorded on the computer readable medium is a computer program product. The use of the computer program product in the computer system 900 preferably effects an advantageous apparatus for image processing.

The software 933 is typically stored in the HDD 910 or the memory 906. The software is loaded into the computer system 900 from a computer readable medium, and executed by the computer system 900. Thus, for example, the software 933 may be stored on an optically readable disk storage medium (e.g., CD-ROM) 925 that is read by the optical disk drive 912. A computer readable medium having such software or computer program recorded on it is a computer program product. The use of the computer program product in the computer system 900 preferably effects an apparatus for image processing, including, for example, a camera or computing device with panoramic stitching functionality based on a determined shift between a pair of images.

In some instances, the application programs 933 may be supplied to the user encoded on one or more CD-ROMs 925 and read via the corresponding drive 912, or alternatively may be read by the user from the networks 920 or 922. Still further, the software can also be loaded into the computer system 900 from other computer readable media. Computer readable storage media refers to any non-transitory tangible storage medium that provides recorded instructions and/or data to the computer system 900 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 901. Examples of transitory or non-tangible computer readable transmission media that may also participate in the provision of software, application programs, instructions and/or data to the computer module 901 include radio or infra-red transmission channels as well as a network connection to another computer or networked device, and the Internet or Intranets including e-mail transmissions and information recorded on Websites and the like.

The second part of the application programs 933 and the corresponding code modules mentioned above may be executed to implement one or more graphical user interfaces (GUIs) to be rendered or otherwise represented upon the display 914. Through manipulation of typically the keyboard 902 and the mouse 903, a user of the computer system 900 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 917 and user voice commands input via the microphone 980.

FIG. 9B is a detailed schematic block diagram of the processor 905 and a "memory" 934. The memory 934 represents a logical aggregation of all the memory modules (including the HDD 909 and semiconductor memory 906) that can be accessed by the computer module 901 in FIG. 9A.

When the computer module 901 is initially powered up, a power-on self-test (POST) program 950 executes. The POST program 950 is typically stored in a ROM 949 of the semiconductor memory 906 of FIG. 9A. A hardware device such as the ROM 949 storing software is sometimes referred to as firmware. The POST program 950 examines hardware within the computer module 901 to ensure proper functioning and typically checks the processor 905, the memory 934 (909, 906), and a basic input-output systems software (BIOS) module 951, also typically stored in the ROM 949, for correct operation. Once the POST program 950 has run successfully, the BIOS 951 activates the hard disk drive 910 of FIG. 9A. Activation of the hard disk drive 910 causes a bootstrap loader program 952 that is resident on the hard disk drive 910 to execute via the processor 905. This loads an operating system 953 into the RAM memory 906, upon which the operating system 953 commences operation. The operating system 953 is a system level application, executable by the processor 905, to fulfil various high level functions, including processor management, memory management, device management, storage management, software application interface, and generic user interface.

The operating system 953 manages the memory 934 (909, 906) to ensure that each process or application running on the computer module 901 has sufficient memory in which to execute without colliding with memory allocated to another process. Furthermore, the different types of memory available in the system 900 of FIG. 9A must be used properly so that each process can run effectively. Accordingly, the aggregated memory 934 is not intended to illustrate how particular segments of memory are allocated (unless otherwise stated), but rather to provide a general view of the memory accessible by the computer system 900 and how such is used.

As shown in FIG. 9B, the processor 905 includes a number of functional modules including a control unit 939, an arithmetic logic unit (ALU) 940, and a local or internal memory 948, sometimes called a cache memory. The cache memory 948 typically include a number of storage registers 944-946 in a register section. One or more internal busses 941 functionally interconnect these functional modules. The processor 905 typically also has one or more interfaces 942 for communicating with external devices via the system bus 904, using a connection 918. The memory 934 is coupled to the bus 904 using a connection 919.

The application program 933 includes a sequence of instructions 931 that may include conditional branch and loop instructions. The program 933 may also include data 932 which is used in execution of the program 933. The instructions 931 and the data 932 are stored in memory locations 928, 929, 930 and 935, 936, 937, respectively. Depending upon the relative size of the instructions 931 and the memory locations 928-930, a particular instruction may be stored in a single memory location as depicted by the instruction shown in the memory location 930. Alternatively, an instruction may be segmented into a number of parts each of which is stored in a separate memory location, as depicted by the instruction segments shown in the memory locations 928 and 929.

In general, the processor 905 is given a set of instructions which are executed therein. The processor 905 waits for a subsequent input, to which the processor 905 reacts to by executing another set of instructions. Each input may be provided from one or more of a number of sources, including data generated by one or more of the input devices 902, 903, data received from an external source across one of the networks 920, 922, data retrieved from one of the storage devices 906, 909 or data retrieved from a storage medium 925 inserted into the corresponding reader 912, all depicted in FIG. 9A. The execution of a set of the instructions may in some cases result in output of data. Execution may also involve storing data or variables to the memory 934.

The disclosed image processing arrangements use input variables 954, which are stored in the memory 934 in corresponding memory locations 955, 956, 957. The image processing arrangements produce output variables 961, which are stored in the memory 934 in corresponding memory locations 962, 963, 964. Intermediate variables 958 may be stored in memory locations 959, 960, 966 and 967.

Referring to the processor 905 of FIG. 9B, the registers 944, 945, 946, the arithmetic logic unit (ALU) 940, and the control unit 939 work together to perform sequences of micro-operations needed to perform "fetch, decode, and execute" cycles for every instruction in the instruction set making up the program 933. Each fetch, decode, and execute cycle comprises:

(a) a fetch operation, which fetches or reads an instruction 931 from a memory location 928, 929, 930;

(b) a decode operation in which the control unit 939 determines which instruction has been fetched; and (c) an execute operation in which the control unit 939 and/or the ALU 940 execute the instruction.

Thereafter, a further fetch, decode, and execute cycle for the next instruction may be executed. Similarly, a store cycle may be performed by which the control unit 939 stores or writes a value to a memory location 932.

Each step or sub-process in the processes of FIGS. 2 to 8 and 10 to 12 is associated with one or more segments of the program 933 and is performed by the register section 944, 945, 946, the ALU 940, and the control unit 939 in the processor 905 working together to perform the fetch, decode, and execute cycles for every instruction in the instruction set for the noted segments of the program 933.

The method of determining a shift between a first image and a second image may alternatively be implemented in dedicated hardware such as one or more integrated circuits performing the functions or sub functions of correlation, hypothesis construction, shift estimation, seam determination, and panoramic image. Such dedicated hardware may include graphic processors, digital signal processors, or one or more microprocessors and associated memories.

Global Alignment Estimation

The present disclosure relates to a method for determining a shift between two images. The method functions by testing multiple shift hypotheses from local correlation peaks derived from projection characteristics to identify a best hypothesis for the shift between the two images. Determining the shift between two images can be utilised to correct alignment of the two images. The present disclosure is referred to as a multi-hypothesis projection-based approach. In one arrangement, the shift estimation is utilised by software instructions executing on processor 150 to align two images captured with camera 100, 927. In a further arrangement, the processor 150 then performs panorama stitching of the two images to produce a panoramic image. The panoramic image is stored in memory 170, along with the original images. In another arrangement, the shift estimation is utilised for stabilising a sequence of images. Foreground/background separation is then performed by processor 150 on the stabilised sequence of images, and the resulting background model and segmentation results are stored in memory 170.

Figure 2:
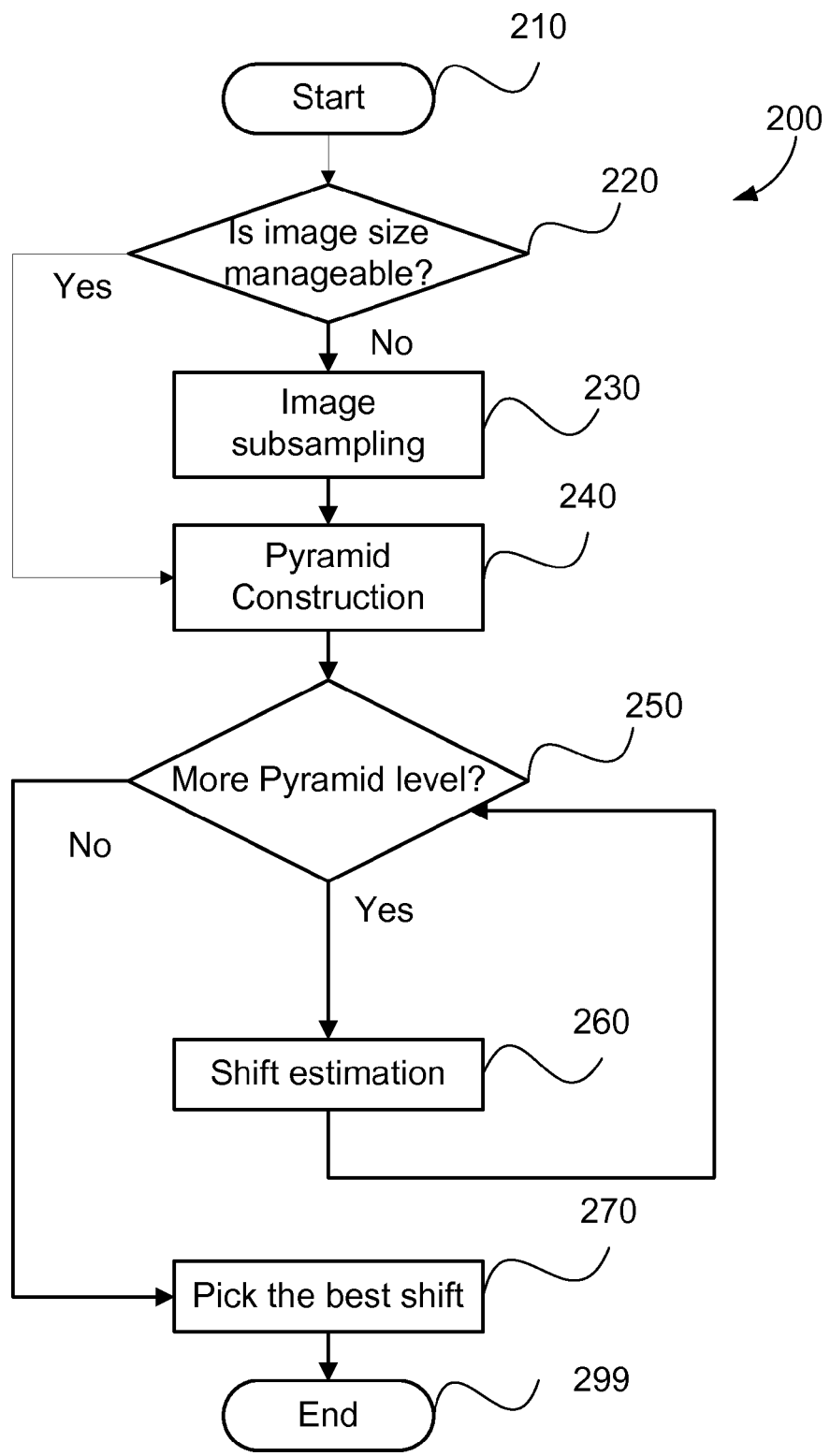
FIG. 2 is a flow diagram illustrating a global alignment estimation process over multiple scales.

FIG. 2 shows a flow diagram illustrating a multi-scale projection-based shift estimation process 200 for global alignment estimation between two images. The two images are referred to in this specification as a first image and a second image. As indicated above, the first image and second image may be derived from the same or different sources. For example, the first image and second image may be successive images in an image sequence captured by a single camera 927, 100. Alternatively, the first image and second image may be images captured by different cameras at substantially the same time or at different times. In one arrangement, the first image and second image are captured by different optical systems of a single camera at substantially the same time.

The first image is considered to be a reference image against which the second image is to be aligned. However, it will be appreciated by a person skilled in the relevant art that the second image may equally be considered as the reference image against which the first image is to be aligned.

The process 200 begins at a Start step 210, wherein the processor 150 receives a first image and a second image that are to be aligned. Control passes from step 210 to a decision step 220, where the processor 150 determines whether the image size of each of the first and second incoming images is manageable for efficiency considerations. Step 220 is optional if processing efficiencies are not of concern or if the received images are known to be of a suitable size.

In one embodiment, the processor 150, in step 220, compares the image size of each of the first and second images with a predetermined threshold, say $256 \times 256 = 256^2$. If the image size is manageable, Yes, control passes from step 220 to step 240. Utilising images of a manageable size for a given application improves efficiency and reduces the effects of noise.

If the image size is not manageable as determined by the processor 150 at step 220, control passes to step 230, which performs subsampling on either one or both of the first and second images to convert either one or both of the first and second images, as required, to a manageable size. In one embodiment, an image is subsampled by performing a Gaussian low-pass filter and picking out every $M^{th}$ sample in each dimension to compose a new image, where M is predetermined, say 2. The new image is referred to as a subsampled image. Control then passes the subsampled images from step 230 to step 240, wherein the processor 150 constructs a pyramid for each subsampled image.

The processor 150, in step 240, constructs a dyadic image pyramid for each of the first and second incoming images. In one embodiment, the pyramid is constructed using blocking summing Blocking summing divides an image into grids, wherein the size of each grid is predetermined, say $2 \times 2$ pixels, and an average number of each grid is computed and used to compose a new image. Blocking summing is then iteratively applied to the newly composed image until a stopping criterion is satisfied. In one embodiment, the stopping criterion is that the number of constructed pyramid levels equals a predetermined number, say 3. In a basic case, the number of pyramid levels is 1, corresponding to the original image or the subsampled image.

Figure 3:
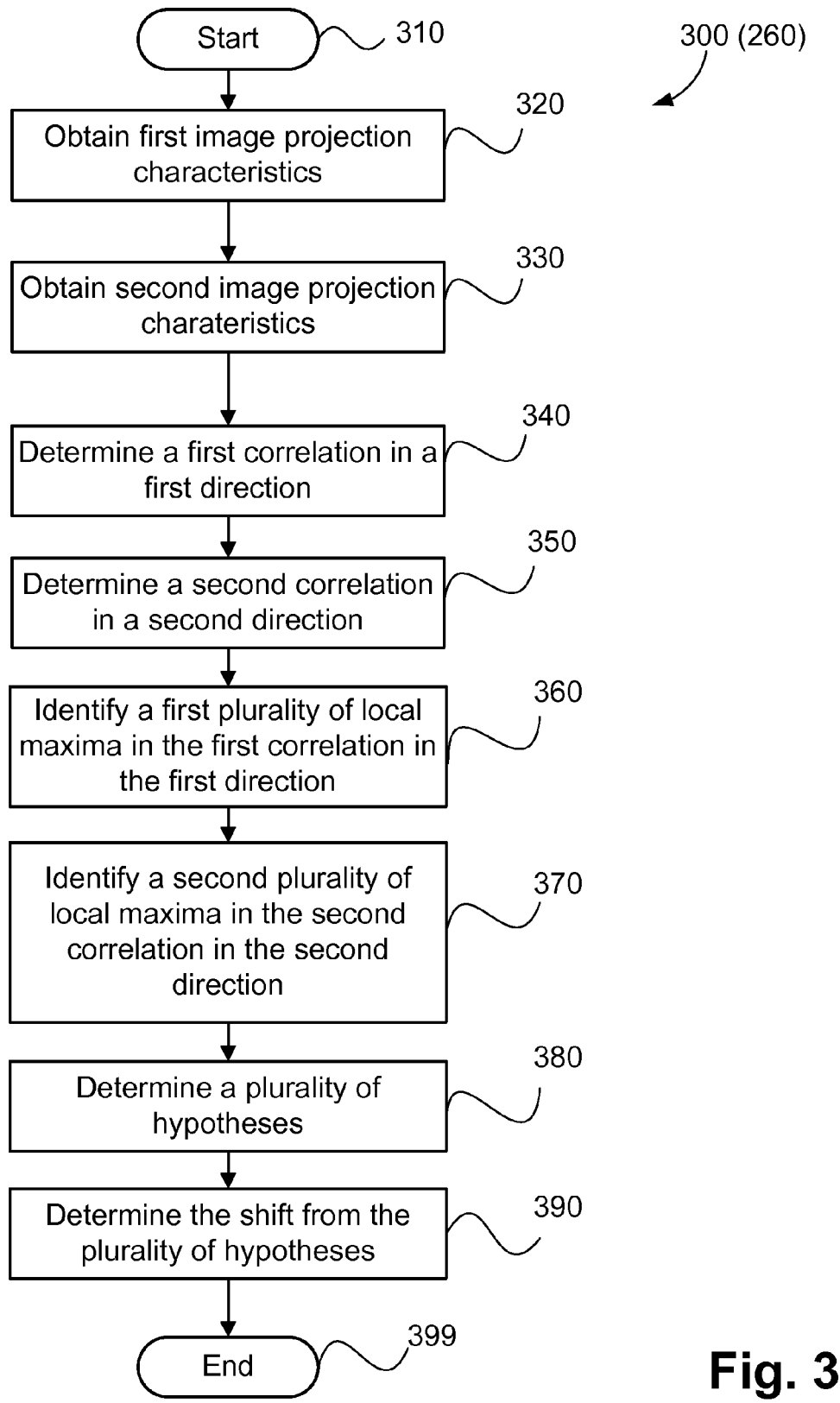
FIG. 3 is a flow diagram illustrating one embodiment of a process for estimating a shift between two images.
Figure 4:
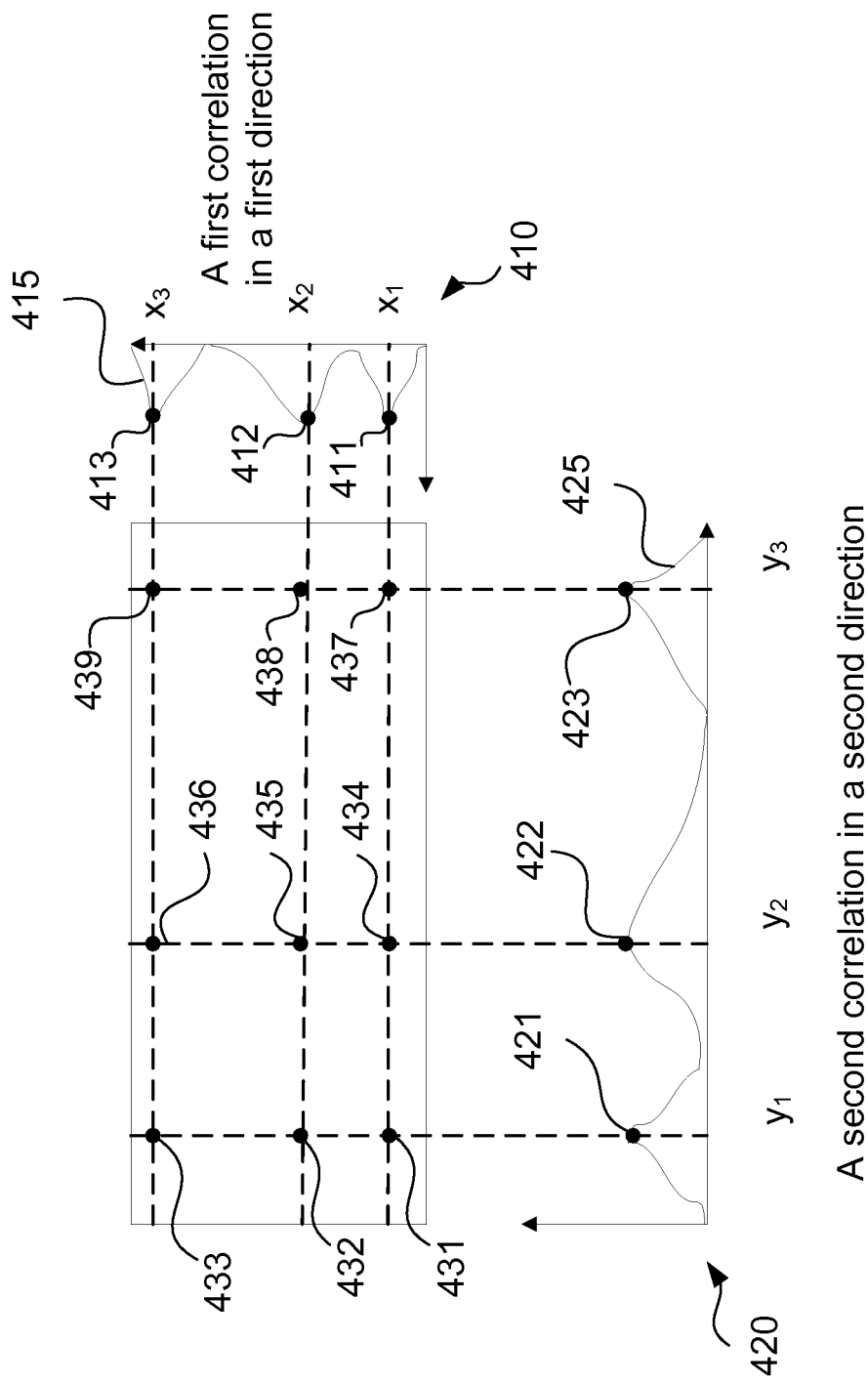
FIG. 4 is an example of determining a set of hypotheses from a plurality of local maxima on a first correlation in a first direction and a plurality of local maxima on a second correlation in a second direction.

After a pyramid is constructed for each of the first and second images, control passes from step 240 to a decision step 250, wherein the processor 150 determines whether there is any pyramid level that needs to be processed. If there is more of the pyramid that needs to be processed, Yes, control passes to step 260, which performs shift estimation between the first image and the second images. Shift estimation step 260 produces the best hypothesis for the layer that is presently being processed, wherein the hypothesis is an estimate of the shift between the first image and the second image. FIG. 3 and FIG. 4 will be used to describe this shift estimation step in greater detail. After shift estimation step 260, control passes back to the decision step 250 to determine whether there is at least one more pyramid level that needs to be processed.

If at step 250 there is a level of the pyramid that needs to be processed, Yes, control returns to step 260 to perform further shift estimation on the unprocessed pyramid level.

If at step 250 there is no further pyramid level that needs to be processed, No, control passes to step 270, wherein the processor 150 picks or selects the best shift estimated from each pyramid level before control terminates at End step 299. In one embodiment, the best shift is the shift (hypothesis) with a highest two-dimensional Normalised Cross-Correlation score ("2D NCC score"). The 2D NCC score is calculated as shown in Eq. (1):

$$NCC_{2D} = \frac{1}{NN-1} \sum_{(x,y)} \frac{(I_1(x,y) - \bar{I}_1)(I_2(x,y) - \bar{I}_2)}{\sigma_{I_1} \sigma_{I_2}} \qquad \text{Eq. (1)}$$

where $I_1$ is the first image on the pyramid that shift comes from;

$I_2$ is the second image on the pyramid that shift comes from;

$I_1$ and $I_2$ have the same number of visual elements;

NN is number of visual elements in $I_1$ and $I_2$;

$I_1(x,y)$ is the value of the visual elements at location (x,y) in $I_1$;

$I_2(x,y)$ is the value of the visual elements at location (x,y) in $I_2$);

$\bar{I}_1$ is the mean value of the visual elements in the first image $I_1$;

$\bar{I}_2$ is the mean value of the visual elements in the second image $I_2$;

$\sigma_{I_1}$ is the standard deviation of the visual elements in the first image $I_1$;

$\sigma_{I_2}$ is the standard deviation of the visual elements in the second image $I_2$.

Aligning two images at multiple subsampled resolutions, corresponding to different layers of the respective pyramids, and taking the best shift estimate is more robust than alignment at a single original resolution. First, noise is substantially reduced by subsampling, while the gradient information of the scene is not so much affected. Subsampling also reduces texture variation and the contribution of texture variation to the gradient projections. Too much subsampling, however, eliminates useful alignment details in the scene. To achieve a best gain in signal-to-noise ratio, in one arrangement the images are aligned over three successively halved pyramid levels starting from an image size of approximately $256^2$ pixels at the base of the pyramid. Block summing is used to subsample the images for efficiency purposes. Block summing produces slightly more aliased images compared to Gaussian subsampling. This introduces some subpixel alignment error. However, the alignment error at a coarse pyramid level can be corrected by subpixel peak interpolation of the NCC computed at the base pyramid level.

At each pyramid level, the translation between two input images is estimated. Image gradients in x- and y-dimensions are estimated using finite difference. The magnitude of the x-gradient image is then integrated along image columns to obtain the x-gradient projection. The y-gradient projection is similarly obtained from the y-gradient image. The corresponding gradient projections from two images are correlated to find multiple possible translations in either dimension. Cross-correlation of zero-padded zero-mean signals is used to detect a large range of possible motion.

If the input images are related by a shift along one image axis only, the projected gradient correlation along that dimension should yield a dominant correlation peak corresponding to the unknown shift. However, if the global translation involves both an x-component and a y-component, the gradient projections in both directions will be contaminated by the non-overlapping area. This signal contamination affects the strength of the correlation peak, sometimes reducing the correlation peak to a non-global peak. To cope with such a situation, one embodiment detects multiple local peaks from each correlation using non-maximum suppression over a pre-defined neighbourhood, such as a 7-pixel neighbourhood. Each correlation peak corresponds to a 1D shift hypothesis. For each 1D shift hypothesis, a 1D NCC score is computed from the overlapping area of the motion-compensated gradient projection profiles. Shift hypotheses with a negative 1D NCC score are rejected.

In one embodiment, if there is a dominant shift hypothesis along one dimension that has a 1D NCC score greater than twice the second strongest score, this shift is taken as the final shift estimate for that dimension for the pyramid layer under consideration. An image pair captured by a slowly moving camera 100, 927 typically has dominant correlation peaks in both dimensions, due to the substantial content overlap between the images in the image pair. An image pair from a panning or tilting camera usually has a dominant correlation peak along the direction of camera motion. In one implementation, the images are motion-corrected and cropped along the dimension corresponding to the direction of camera motion before re-estimating the shift along the other dimension. The cropping increases the overlapping area of the two new images, which leads to a more reliable shift estimation for the other dimension. Improving the image overlap is important for applications that experience motion larger than a percentage, say 10%, of the image.

FIG. 3 shows a flow diagram of a process 300 corresponding to one embodiment of the shift estimation process 260 of FIG. 2. The process 300 begins at a Start step 310 when control is passed from decision step 250, where the processor 150 determines whether there is another pyramid level that needs to be processed. The process 300 receives the two images that are to be aligned. Control then passes to a first step 320, in which the processor 150 obtains the first image projection characteristics in first and second directions. In one embodiment, the first image projection characteristics are the projections of the gradient magnitude type along vertical and horizontal axes of the first image on the pyramid to be processed. In another embodiment, the first image projection characteristics are the projections of the intensity along vertical and horizontal axes of the first image on the pyramid to be processed. Depending on the application, the projection characteristics may relate to different properties in the first and second directions. In one example, the projection characteristics are the projections of the gradient magnitude in the x-axis direction and the projections of the intensity in the y-axis direction.

In one implementation, the image projection characteristics along an axis are determined by summing the relevant characteristics along that axis. For example, when the first image projection characteristics in a first direction of interest correspond to the projections of the gradient magnitudes along the x-axis, the gradient magnitudes along the x-axis are summed to provide the first image projection characteristics in the first direction.

Control passes from step 320 to step 330, which obtains the second image projection characteristics. The second image projection characteristics are the same type or types as the first image projection characteristics. That is, if the first image projection characteristic obtained in step 320 corresponds to a gradient magnitude in the x-axis and y-axis directions, the second image projection characteristic obtained in step 330 corresponds to a gradient magnitude in the x-axis and y-axis directions. Similarly, if the first image projection characteristic obtained in step 320 corresponds to projections of intensity in the x-axis direction and projections of gradient magnitude in the y-axis direction, then the second image projection characteristic obtained in step 330 corresponds to projections of intensity in the x-axis direction and projections of gradient magnitude in the y-axis direction.

Control then passes to step 340, in which the processor 150 determines a first correlation in a first direction. In one embodiment, the first direction is a vertical direction, and the first correlation is cross-correlation of the projections of the gradient magnitudes of the two images along the first direction. A projection can also be referred to as a signal. In this specification, the terms 'projection' and 'signal' are used interchangeably. The projections of the gradient magnitudes are zero-padded and zero-mean signals. A zero-padded zero-mean signal is the signal extended with zeros and subtracted by the mean value of the projection. Control then passes to step 350, wherein the processor 150 determines a second correlation in a second direction. In one embodiment, the second direction is the horizontal direction, and the second correlation is a cross-correlation of the projections of the gradient magnitudes of the two images along the second direction. The projections of the gradient magnitudes are zero-padded and zero-mean signals.

The control then passes to step 360, wherein the processor 150 identifies a first plurality of local maxima in the first correlation in the first direction. In one embodiment, the local maxima in the first correlation are the first $K_1$ local peaks with largest one-dimensional Normalised Cross Correlation (1D NCC) scores along a vertical direction, where $K_1$ is a predetermined number, say 5. The 1D NCC is calculated as shown in Eq. (2):

$$NCC_{1D} = \frac{1}{NN-1} \sum_x \frac{(S_1(x) - \overline{S_1})(S_2(x) - \overline{S_2})}{\sigma_{s_1} \sigma_{s_2}} \qquad \text{Eq. (2)}$$

where $S_1$ is the projection characteristics of the first image on the pyramid level to be processed;
$S_2$ is the projection characteristics of the second image on the pyramid level to be processed;
$S_1$ and $S_2$ have the same number of elements in the projection characteristics;
NN is number of elements in $S_1$ and $S_2$;
$S_1(x)$ is the value of the element at location (x) in $S_1$;
$S_2(x)$ is the value of the element at location (x) in $S_2$;
$\overline{S_1}$ is the mean value of the elements in $S_1$;
$\overline{S_2}$ is the mean value of the elements in $S_2$;
$\sigma_{S_1}$ is the standard deviation of the elements in $S_1$;
$\sigma_{S_2}$ is the standard deviation of the elements in $S_2$.

The local peaks are determined using non-maximum suppression over a 7-pixel neighbourhood, which is a method that places a 7-pixel sliding window from the start of a signal to the end of the signal and finds a local peak in each sliding window. The 1D NCC score of each determined local peak is computed and the first $K_1$ local peaks with highest 1D NCC scores are selected. The control then passes to step 370, wherein the processor 150 identifies a second plurality of local maxima in the second correlation in the second direction. In one embodiment, the local maxima in the second correlation are the first $K_2$ local peaks with largest 1D NCC scores along the horizontal direction, where $K_2$ is a predetermined number. In one embodiment, $K_2$ is equal to $K_1$. In another embodiment, $K_2$ is different from $K_1$. The local peaks are determined using non-maximum suppression over a 7-pixel neighbourhood. The 1D NCC score of each determined local peak is computed and the first $K_2$ local peaks with highest 1D NCC scores are selected.

After identifying the local maxima along the first and second directions, the control passes to step 380, wherein the processor 150 determines a set of hypotheses from the first plurality of local maxima of the first correlation and the second plurality of local maxima of the second correlation. Each hypothesis includes a local maximum selected from the first plurality of local maxima of the first correlation and a local maximum selected from the second plurality of local maxima in the second correlation. FIG. 4 describes this step in further detail. Each hypothesis represents an estimate, for the layer of the pyramid that is being processed, of the shift between the first image and second image. The control then passes to step 390 for processor 150 to determine the shift from the set of hypotheses determined in step 380, before the shift estimation process terminates at End step 399. In one embodiment, a 2D NCC score is calculated for each hypothesis determined in step 380, and the hypothesis with the highest 2D NCC score is selected as the best shift estimate between the first and the second images, for the layer of the pyramid that is being processed.

Figure 11A:
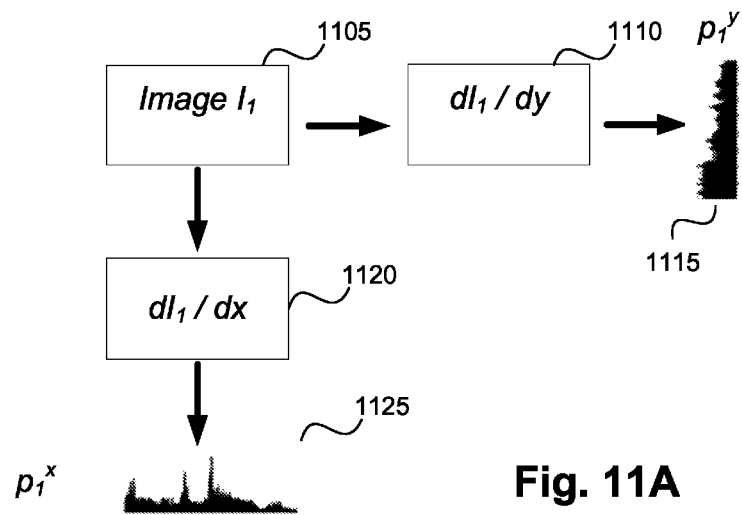
FIGS. 11A, 11B, and 11C illustrate an example for determining a set of hypotheses using a gradient projection alignment method.
Figure 11B:
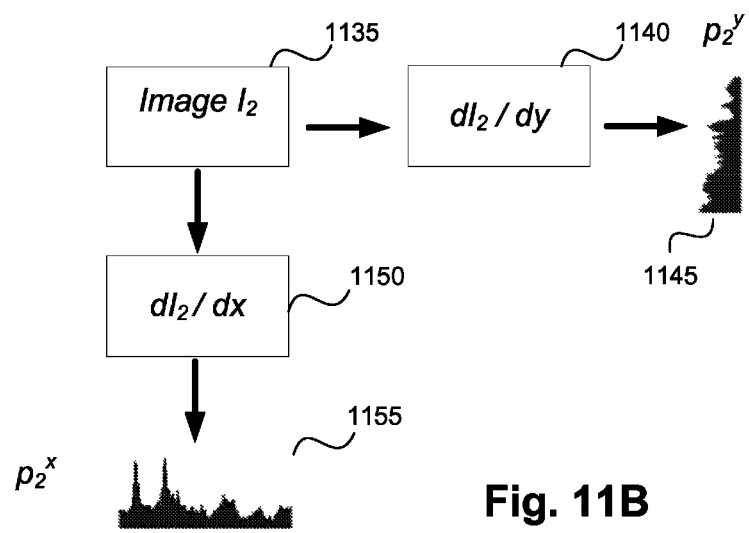
Figure 11C:
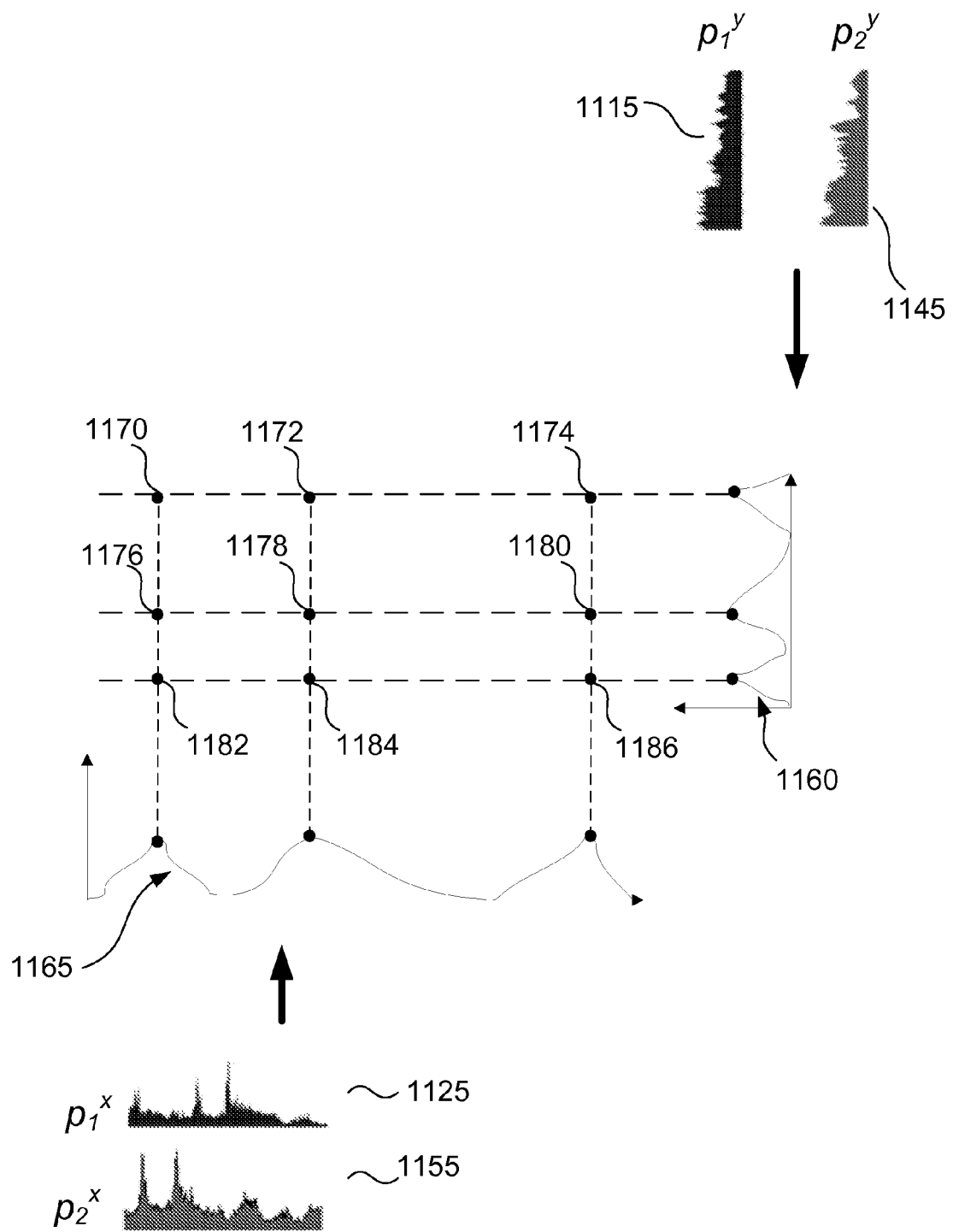

FIGS. 11A to 11C illustrate an example for determining a set of hypotheses using a gradient projection alignment method in accordance with the present disclosure, when there is no dominant correlation peak in either dimension. $I_1$ is a first input image and $|\partial I_1/\partial x|$ and $|\partial I_1/\partial y|$ are the gradient magnitudes of $I_1$ in x-dimension and y-dimension.

In FIGS. 11A to 11C, $p_1^x = \int |\partial I_1/\partial x| \partial y$ and $p_1^y = \int |\partial I_1/\partial_y| \partial x$ are the gradient projections along the vertical and horizontal axis, respectively. Similarly, $p_2^x$ and $p_2^y$ are the gradient projections of a second image $I_2$. The correlation of $p_1^x$ and $p_2^x$ has a number of local correlation peaks. These correlation peaks correspond to multiple 1D shift hypotheses along the x-dimension. Multiple 2D shift hypotheses are derived from combinations of the 1D shift hypotheses in both dimensions, and preferably all combinations of the 1D shift hypotheses in both dimensions. A 2D NCC score is obtained for each of these 2D shift hypotheses from the overlapping area of the input images as defined by the shift. The shift hypothesis with the highest 2D NCC score is then refined to a subpixel accuracy by an elliptical paraboloid fit over a 3×3 neighbourhood around the 2D NCC peak.

FIG. 11A shows a first input image $I_1$ 1105, a gradient magnitude 1120 of $I_1$ in the x-direction, and a gradient magnitude 1110 of $I_1$ in the y-direction. Integrating the gradient magnitude 1120 of $I_1$ in the x-direction provides gradient projections 1125 for the first image $I_1$ 1105 in the x-direction. Integrating the gradient magnitude 1110 of $I_1$ in the y-direction provides gradient projections 1115 for the first image $I_1$ 1105 in the y-direction.

FIG. 11B shows a second input image $I_2$ 1135, a gradient magnitude 1150 of $I_2$ in the x-direction, and a gradient magnitude 1140 of $I_2$ in the y-direction. Integrating the gradient magnitude 1150 of $I_2$ in the x-direction provides gradient projections 1155 for the second image $I_2$ 1135 in the x-direction. Integrating the gradient magnitude 1140 of $I_2$ in the y-direction provides gradient projections 1145 for the second image $I_2$ 1135 in the y-direction.

FIG. 11C shows the gradient projections in the x-direction 1125, 1155 for the first image $I_1$ 1105 and the second image $I_2$ 1135. The correlation of the gradient projections 1125, 1155 in the x-direction is shown as a first correlation curve 1165, which, in this example, has three maxima. FIG. 11C shows the gradient projections in the y-direction 1115, 1145 for the first image $I_1$ 1105 and the second image $I_2$ 1135. The correlation of the gradient projections 1115, 1145 in the y-direction is shown as the second curve 1160, which, in this example, also has three maxima. Projecting the peaks from the first correlation curve 1165 and the peaks from the second correlation curve 1160 provides a set of hypotheses (the amount of shift in the x-direction and y-direction, expressed in (x, y) coordinates) in the form of a number of intersecting points 1170, 1172, 1174, 1176, 1178, 1180, 1182, 1184, and 1186. Each of the intersecting points 1170, 1172, 1174, 1176, 1178, 1180, 1182, 1184, and 1186 is a hypothesis that includes a local maximum from the first correlation 1165 and a local maximum from the second correlation 1160, wherein each hypothesis is a shift estimate for the shift between the first image and the second image. In other words, each of the set of hypothesis for the amount of shifts in the x and y-direction is a combination of a local maximum from the first correlation and a local maximum from the second correlation.

FIG. 4 shows an example of determining a set of hypotheses from the first plurality of local maxima of the first correlation and the second plurality of local maxima of the second correlation, corresponding to step 380 of FIG. 3. The example of FIG. 4 will be described with reference to first and second incoming images comprising a corresponding plurality of visual elements in the form of pixels. For this example, the projection characteristics correspond to the gradient magnitude of the pixels in first and second directions corresponding to projections of the x-axis and y-axis, respectively.

FIG. 4 shows a first correlation 410 in a first direction (the x-direction). The first correlation 410 is represented by a curve 415 that illustrates the first correlation of each location along the first direction, corresponding in this example to the x-axis. In this example, the first correlation 410 of the first direction includes three local maxima 411, 412 and 413. The three local maxima are at locations $(x_1)$, $(x_2)$ and $(x_3)$. FIG. 4 also shows a second correlation 420 in a second direction (the y-direction). The second correlation 420 is represented by a curve 425 that illustrates the second correlation of each location along the second direction, corresponding in this example to the y-axis. In this example, the second correlation 420 of the second direction includes three local maxima 421, 422 and 423 at locations $(y_1)$, $(y_2)$ and $(y_3)$. The local maxima of the first correlation 410 and the local maxima of the second correlation 420 are utilised to form a set of hypotheses, wherein each hypothesis includes a local maximum of the first correlation 410 in the first (x) direction and a local maximum of the second correlation 420 in the second (y) direction. Exemplary possible hypotheses are illustrated as intersecting points, representing a combination, of the first plurality of local maxima of the first correlation and the second plurality of local maxima in the second maxima, when projected along the respective axes. The set of hypotheses for this example are shown at locations $(x_1, y_1)$ 431, $(x_2, y_1)$ 432, $(x_3, y_1)$ 433, $(x_1, y_2)$ 434, $(x_2, y_2)$ 435, $(x_3, y_2)$ 436, $(x_1, y_3)$ 437, $(x_2, y_3)$ 438, and $(x_3, y_3)$ 439.

Figure 12:
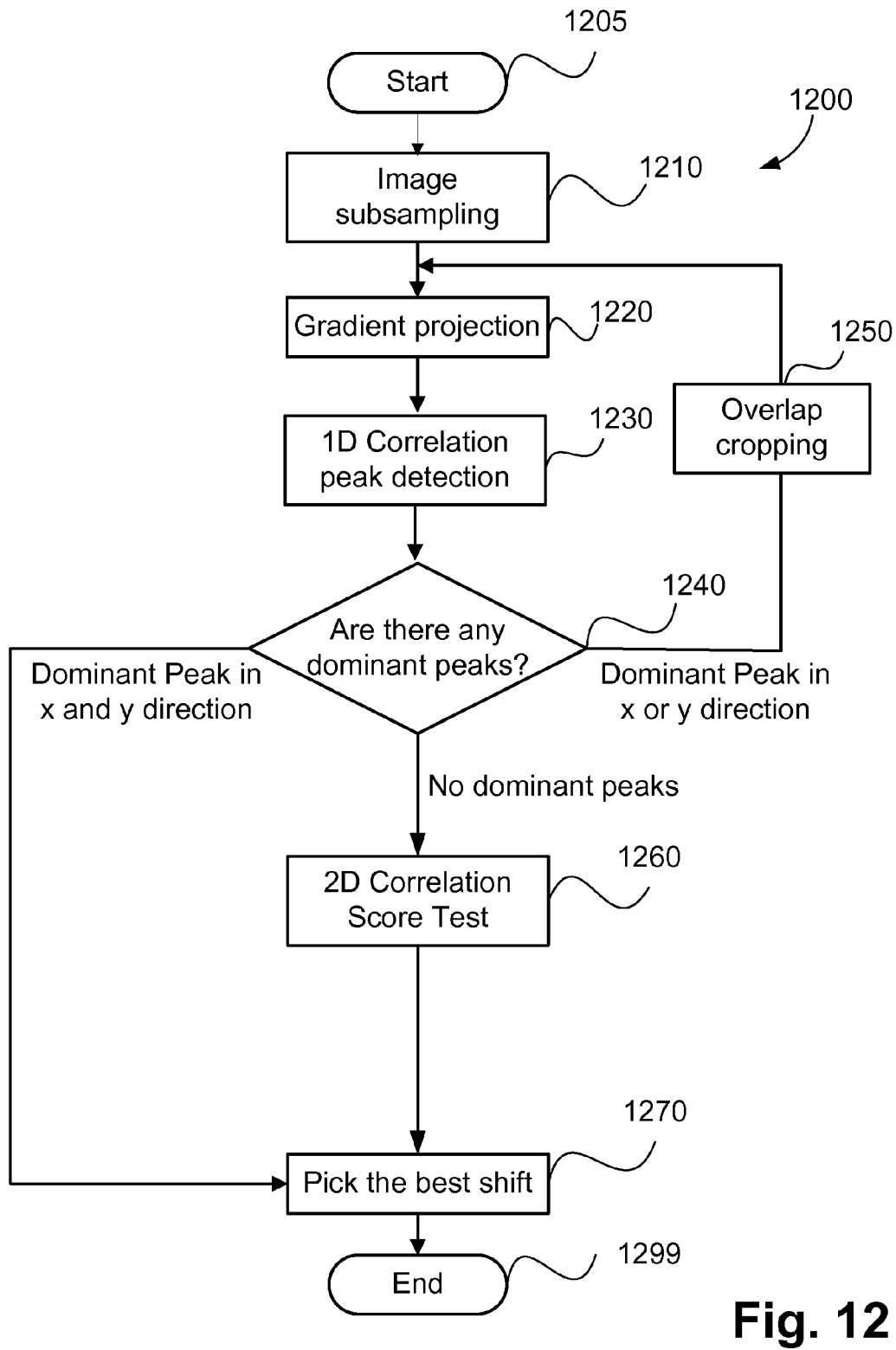
FIG. 12 is a flow diagram illustrating a multi-hypothesis projection-based shift estimation process.

FIG. 12 is a flow diagram of a multi-hypothesis projection-based shift estimation process 1200. The process 1200 begins at a Start step 1205, wherein the processor 150 receives first and second input images, and proceeds to step 1210. The processor 150, in step 1210, performs subsampling on the first and second input images to reduce the input images to a manageable size, such as 256×256 pixels, before alignment. Control passes to step 1220, wherein the processor 150 estimates the 2D translation separately in the x- and y-dimensions using projections onto the corresponding axis of the directional gradient magnitude (rather than gradient energy) of the respective images.

The algorithm is robust to large translations due to the multiple shift hypotheses approach. Control passes from step 1220 to step 1230, wherein the processor 150 selects, for each pair of 1D projections, k shift hypotheses based on a strong 1D NCC score (say, k=5). This is essentially a sub-set of the set of available hypotheses. Control passes from step 1230 to step 1240, which determines whether there are any dominant peaks. Any shift candidate with a dominant 1D NCC score is the final shift for that dimension. Thus, if at step 1240 there is a dominant peak in the x-direction and y-direction, control passes to step 1270, which selects that dominant peak as the best shift estimate. If at step 1240 only one dimension has a dominant NCC score, control passes to step 1250 to crop the two images to an overlapping area along this dimension before returning to step 1220 to recompute the shift along the other dimension. If at step 1240 there is no shift hypothesis with a dominant 1D NCC score, control passes to step 1260, wherein the processor 150 determines $k^2$ 2D shift hypotheses from the 1D shift hypotheses, as described with reference to FIG. 4 and FIGS. 11A-11C. The shift candidate with the highest 2D NCC score is the final 2D shift. Control passes from step 1260 to step 1270 for the processor 150 to select that shift candidate as the final shift between the two images. Control passes from step 1270 to an End step 1299 and the process 1200 terminates.

According to this approach, using the coordinates of the hypothesis, the second image is shifted relative to the first image, and the two images are overlaid on one another and the two-dimensional correlation score is calculated. This enables the selection of one of the set of hypotheses as the shift between the first image and the second image based on the calculated two-dimensional correlation score Note that the process 1200 typically passes from step 1240 to step 1270 to select the best shift if two images have substantial overlap. Control passes from step 1240 to step 1250 if there is a large shift in only one dimension. Step 1260 is the most computationally intensive part, due to the computation of $k^2$ 2D NCC scores. Fortunately, for sweeping panorama, the translation is mainly along one direction and consequently control generally passes from step 1240 to step 1250 to step 5, which requires significantly fewer 2D NCC score computations to find a correct translation.

Figure 5:
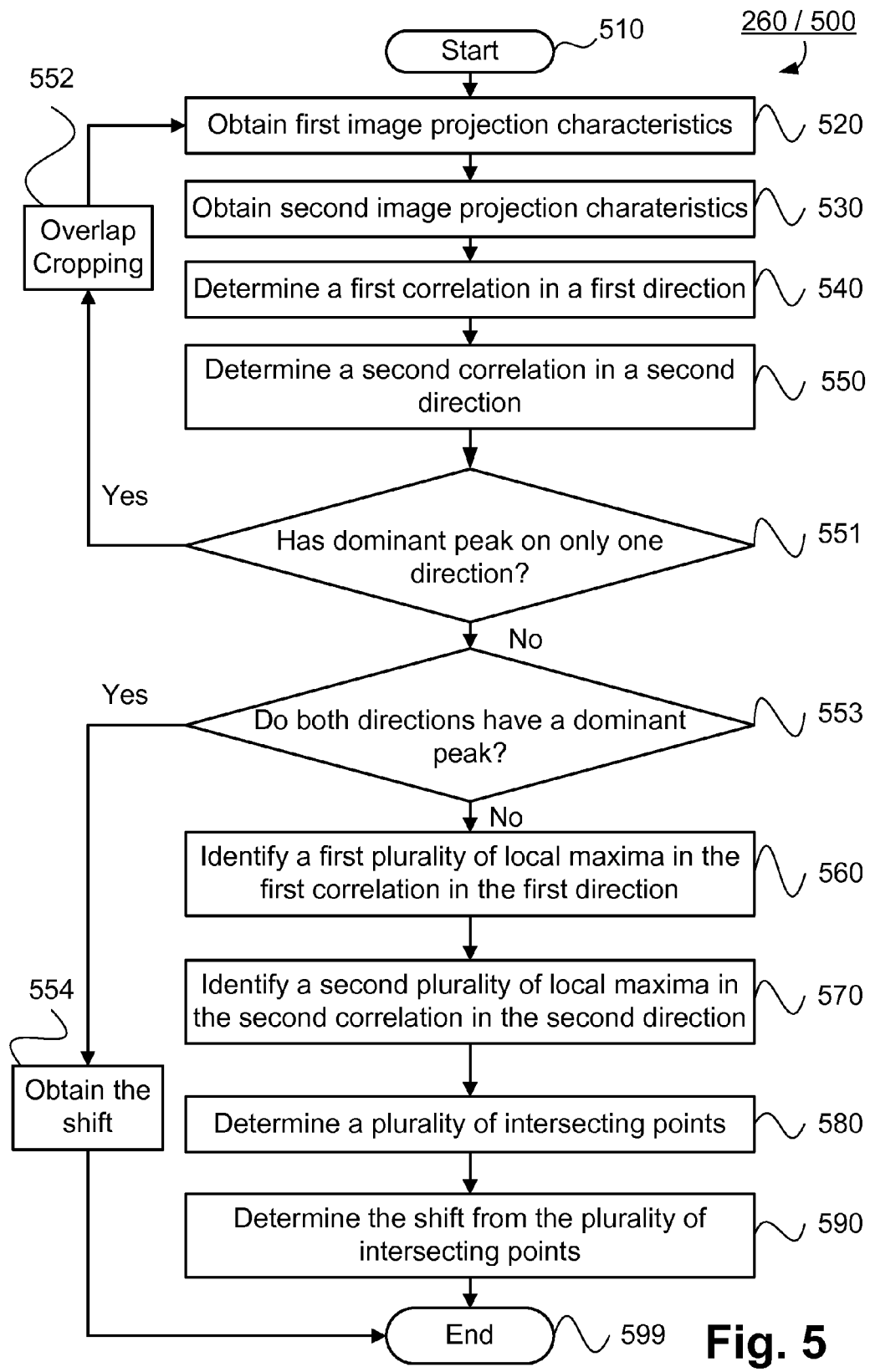
FIG. 5 is a flow diagram illustrating an alternative embodiment of a process for estimating a shift between two images.

FIG. 5 shows a flow diagram of a process 500 corresponding to an alternative embodiment of the shift estimation process 260 of FIG. 2. The process 500 begins at a Start step 510 when control is passed from the decision step 250, wherein the processor 150 determines whether there are any more pyramid levels that need to be processed, and the first and second images to be aligned are fed into this process 500. In the example of FIG. 2, the first and second images received by process 500 are subsampled images of the original input images at a particular pyramid layer. Control then passes to step 520, which obtains the first image projection characteristics. In one embodiment, the first image projection characteristics are the projections of the gradient magnitude along vertical and horizontal axes of the first image on the pyramid to be processed. Control then passes to step 530, wherein the processor 150 obtains the second image projection characteristics. The second image projection characteristics are the same type as the first image projection characteristics for the respective directions. Control then passes to step 540, wherein the processor 150 determines a first correlation in a first direction.

In one embodiment, the first direction is a vertical direction, and the first correlation is a cross-correlation of the projections of the gradient magnitudes of the two images along the first direction. The projections of the gradient magnitudes are zero-padded and zero-mean signals. A zero-padded zero-mean signal is the signal extended with zeros and subtracted by the mean value of the projection. Control then passes to step 550, wherein the processor 150 determines a second correlation in a second direction. In one embodiment, the second direction is the horizontal direction, and the second correlation is a cross-correlation of the projections of the gradient magnitudes of the two images along the second direction. The projections of the gradient magnitudes are zero-padded and zero-mean signals.

The control then passes to a decision step 551, which determines whether there is only one direction that has a dominant peak. In one embodiment, the dominant peak is determined as the peak having an associated 1D NCC score that is greater than twice the second highest 1D NCC score. If there is only one direction that has a dominant peak at the decision step 551, Yes, control passes to cropping step 552. In cropping step 552, the processor 150 determines the overlapping area in the first and the second images along the direction that has the dominant peak and crops the non-overlap areas in both incoming images along that direction. After the cropping step 552, control returns to step 520 to determine the first image projection characteristics of the first cropped image.

Returning to step 551, if neither of the directions has a dominant peak or both of the directions have a dominant peak and thus there is not a dominant peak in only one direction, No, control passes to a second decision step 553, in which the processor 150 determines whether both directions have a dominant peak. If both directions have a dominant peak, Yes, control passes to step 554, which obtains the shift. The shift is derived from the dominant peak in each direction, wherein the shift is a hypothesis pair of a shift in the first direction and a shift in the second direction. Control passes from step 554 to an End step 599 and the process 500 terminates.

If at step 553 neither of the directions has a dominant peak, No, control passes from step 553 to step 560, wherein the processor 150 identifies a first plurality of local maxima in the first correlation in the first direction. In one embodiment, the local maxima in the first correlation are the first $K_1$ local peaks along a vertical direction with largest 1D NCC scores, where $K_1$ is a predetermined number, say 5. The local peaks are determined using non-maximum suppression over a 7-pixel neighbourhood. Then the 1D NCC score of each determined local peak is computed and the first $K_1$ local peaks with highest 1D NCC scores are selected. The control then passes to step 570, which identifies a second plurality of local maxima in the second correlation in the second direction. In one embodiment, the local maxima in the second correlation are the first $K_2$ local peaks along horizontal direction with largest 1D NCC scores, where $K_2$ is a predetermined number, say 4. In one embodiment, $K_2$ is equal to $K_1$. In an alternative embodiment, $K_2$ is different from $K_1$. The local peaks are determined using non-maximum suppression over a 7-pixel neighbourhood. Then the 1D NCC score of each determined local peak is computed and the first $K_2$ local peaks with highest 1D NCC scores are selected.

After identifying the local maxima along the first and second directions, the control passes to step 580, wherein the processor 150 determines a set of hypotheses, wherein each hypothesis includes a local maximum of the first correlation and a local maximum of the second correlation. For instance, the local maxima along the first direction are at locations $(x_1, x_2, x_3)$ and the local maxima along the second direction are at locations $(y_1, y_2, y_3)$. The set of hypotheses includes the combinations: $(x_1, y_1)$, $(x_1, y_2)$, $(x_1, y_3)$, $(x_2, y_1)$, $(x_2, y_2)$, $(x_2, y_3)$, $(x_3, y_1)$, $(x_3, y_2)$, and $(x_3, y_3)$. The control then passes to step 590 for the processor 150 to determine the shift between the first and second images, based upon the set of hypotheses determined in step 580, before the shift estimation process terminates at an End step 599. In one embodiment, a 2D NCC score is calculated for each hypothesis determined in step 580, and the hypothesis with highest 2D NCC score is selected as the shift between the two incoming images.

Seamless Panorama Stitching

Using the global shift estimation information from consecutive images from an image sequence, it is possible to combine a plurality of images to form a panoramic image. The plurality of images may be, for example, from a panning image sequence. If the alignment is accurate to a subpixel level, frame averaging can be used for image composition. However, subpixel alignment over all overlapping image pairs is difficult for a moving camera with moving objects in the scene. An easier and more effective way is to segment the mosaic and use a single image per segment. One implementation efficiently locates the seam boundaries that result in a minimum intensity mismatch between adjacent segments. Laplacian pyramid blending is then used to smooth out any remaining seam artefacts.

Figure 6:
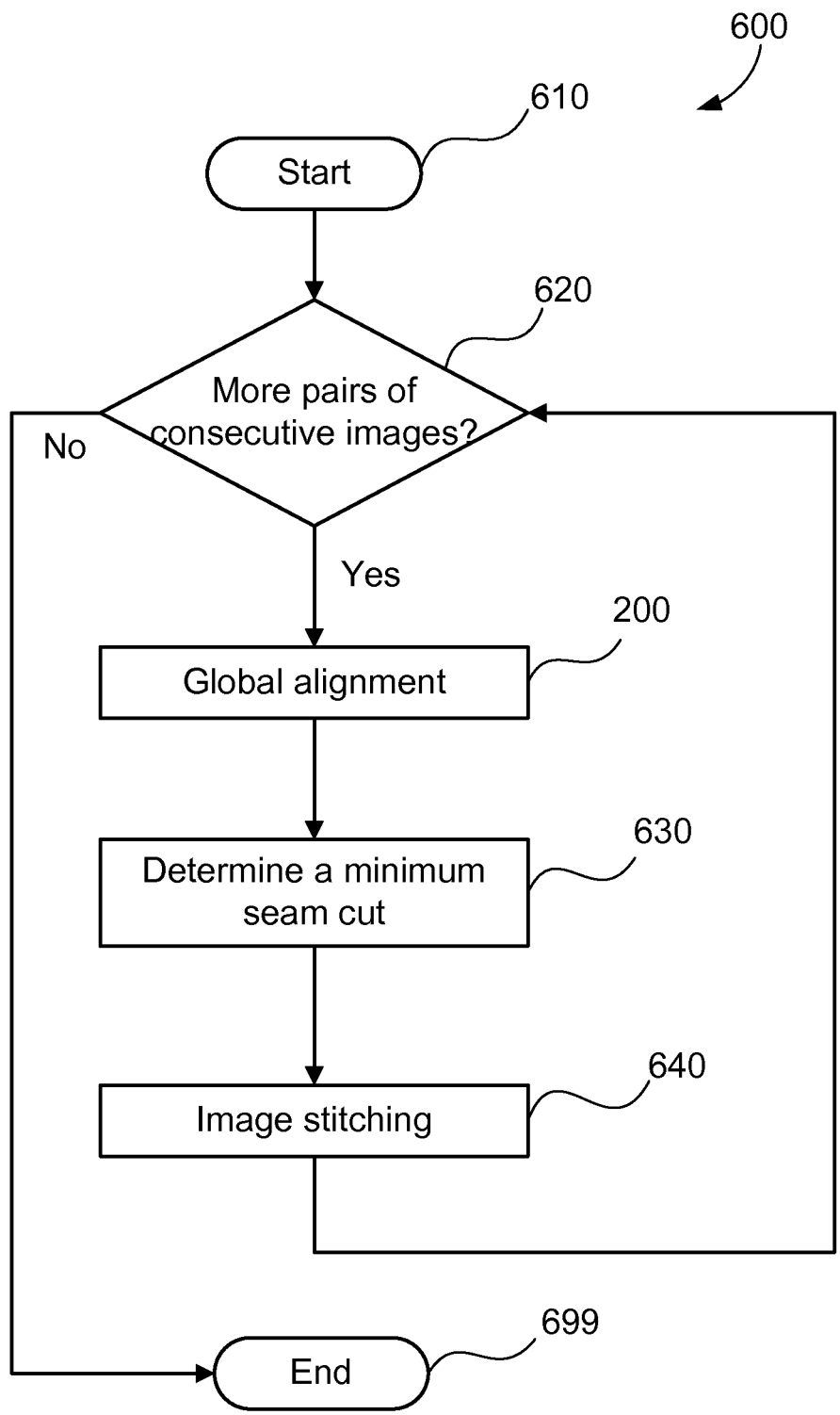
FIG. 6 is a flow diagram illustrating a sweeping panorama reconstruction process.

FIG. 6 is a flow diagram illustrating a process 600 of sweeping panorama reconstruction that utilises the global shift estimation. The process 600 starts at a Start step 610 with an image sequence of a plurality of images captured by one or more cameras 100. Control passes from the Start step 610 to a decision step 620, wherein the processor 150 detects whether there is at least one more pair of consecutive images in the image sequence to be processed. If there are no more pairs of consecutive images to be processed, No, control passes to an End step 699 and the process 600 terminates.

Figure 7:
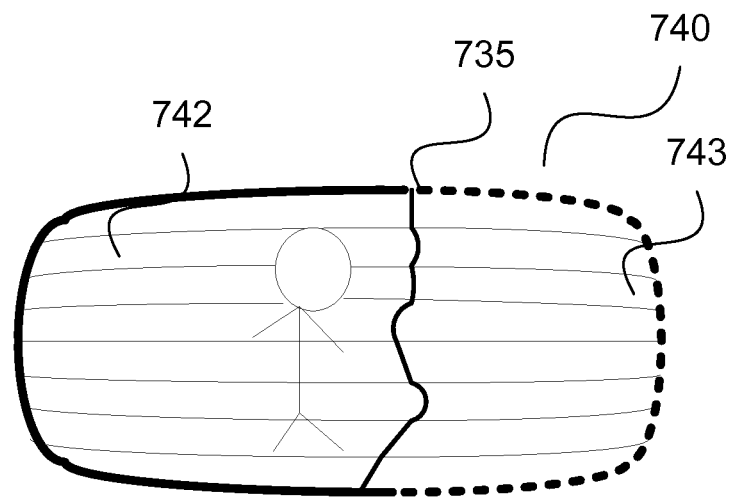
Figure 8:
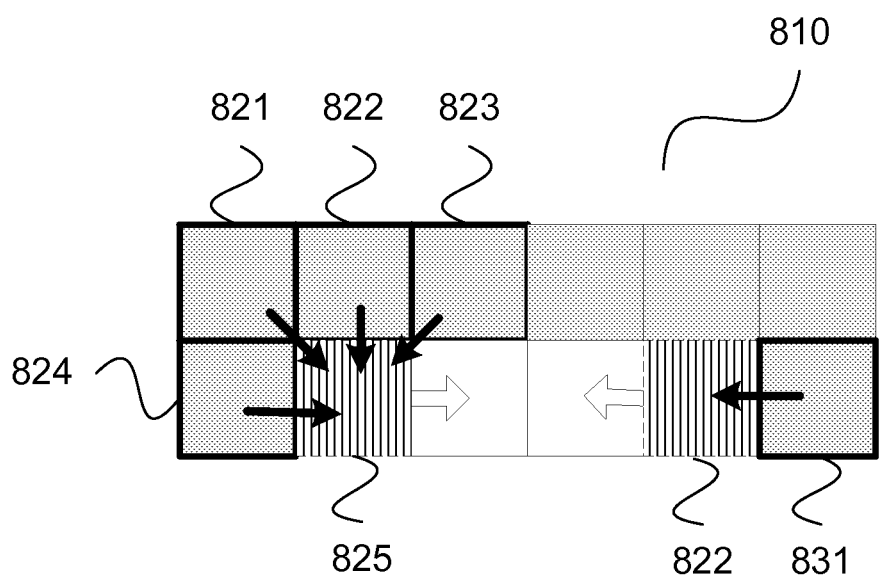
FIG. 8 illustrates an example of the greedy grey-weighted distance transform.

If at step 620 there is at least one more pair of consecutive images, Yes, control passes to step 200, which estimates a global shift between consecutive images in the pair. Control then passes to step 630, which determines a minimum seam cut to be used in joining the consecutive images in the pair. FIG. 7 and FIG. 8 will describe this step in greater detail. Control then passes to step 640, which applies image stitching to join the images in the pair of images that is being processed. In one embodiment, a Laplacian pyramid is constructed for each incoming image. A Laplacian pyramid is a decomposition of the original image into a hierarchy of images, such that each level corresponds to a different band of image frequencies. For each Laplacian pyramid level, the seamless panorama stitching is applied to produce a stitched panorama corresponding to that pyramid level. The panorama is then constructed by composing the stitched panorama from each pyramid level. After stitching in step 640, control passes back to the decision step 620 to determine whether there are any more pairs of consecutive images remaining to be processed.

One embodiment of the present disclosure provides a camera 100 with capability for performing seamless panorama stitching on a pair of images captured by the optical system 103 and sensor 121. The steps of the method for shift estimation and panoramic stitching are performed by instructions executing on the controller 122. An alternative embodiment provides a computer module 901 for performing image processing on a pair of images, wherein the image processing includes seamless panorama stitching. The steps of the method for shift estimation and panoramic stitching are performed by instructions executing on the processor 150.

Minimum Seam Cut Using Greedy Grey-Weighted Distance Transform

A minimum seam is a path that divides two overlapping images in two portions such that a combined image constructed by joining the two overlapping images along the seam has a minimum total intensity difference across the seam. Two images to be joined are roughly aligned by an integral-pixel translation. However, due to camera projective distortion, the overlapping areas of these two images do not match perfectly. The absolute difference of the two images is non-zero. The minimum path from top to bottom goes through image regions of low intensity differences. As a result, the combined image along this seam exhibits no obvious mismatch along the seam.

Most solutions to the minimum cut (also known as min-cut) problem involve some form of grey-weighted distance propagation. The grey-weighted distance transform of a non-negative cost image at any pixel is defined as the total intensity along a minimum cost path from the source (top row) to that pixel. Dynamic programming is a greedy solution to this min-cut problem, where the approximated distance is propagated from one row to the next using an update rule. The unknown distance of a current pixel is computed as the minimum distance of the three neighbours of the current pixel on the previous row plus the current cost value of the current pixel. The neighbour whose distance is propagated to the current pixel is called the parent node. The minimum cost path from top to bottom is then backtracked from the pixel with minimum distance on the bottom row following the path of its ancestors. Dynamic programming is very efficient, requiring only one pass over the cost image.

Due to the update structure of dynamic programming, its min-cut path is limited to either going straight down or having a ±45° downward turn. This path is not flexible enough to go around large moving objects that appear as bright blobs in the cost image. As a result, a different update rule with more accurate estimation of the distance transform is required. Although the grey-weighted distance transform can be computed exactly using the chamfer distance transform algorithm, this solution requires multiple forward and backward passes over the image.

In one embodiment, a greedy chamfer distance transform algorithm is used, which only uses two passes over the image. While the forward pass uses the chamfer distance transform algorithm, the backward pass propagates distance from only one future neighbour on the same scan-line. This backward pass is executed immediately after the forward pass on each scan-line. As a result, if the scan-line is buffered in memory, the algorithm effectively requires only one pass over the cost image. This greedy algorithm allows the min-cut path to go sideways as well as downwards.

Figure 7A:
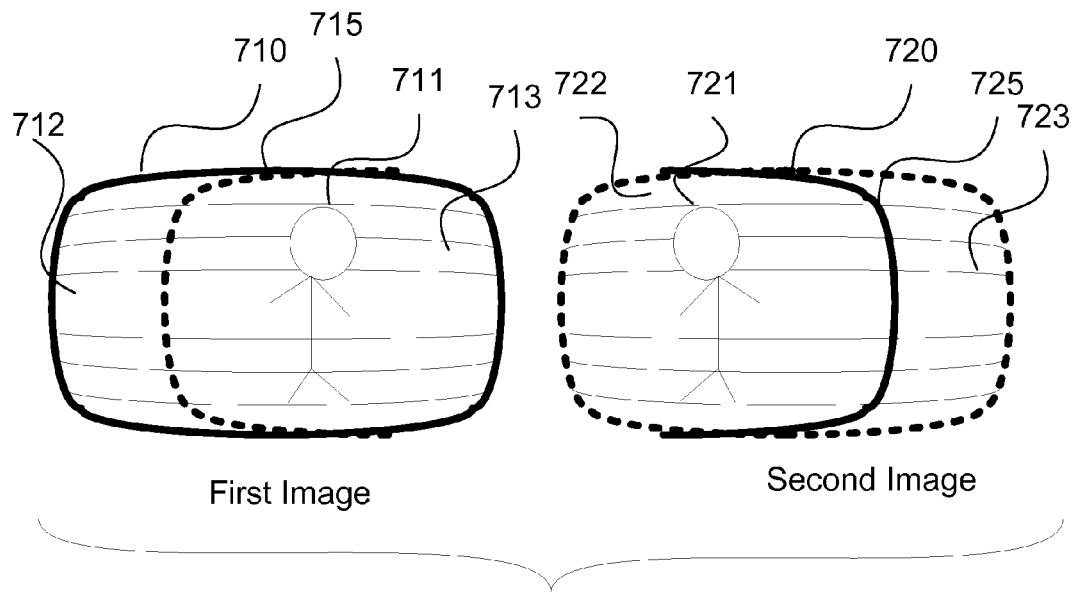
FIGS. 7A, 7B, and 7C illustrate an example of stitching two images to form a panoramic image.
Figure 7B:
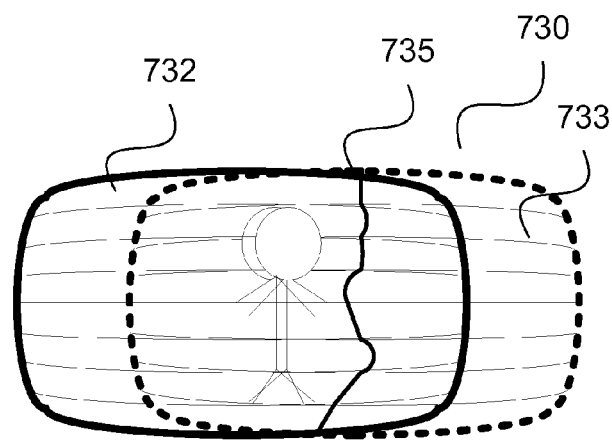

FIGS. 7A, 7B, and 7C illustrate the minimum seam concept using two images captured by a panning camera, wherein the two images capture respective portions of a scene. The second image is captured after the first image.

FIG. 7A shows a first image 710 and a second image 720. There is a person present in each of the images 710, 720: a person 711 in the first image 710 and a person 721 in the second image 720. An area 712 on the left of the first image 710 is a portion of the scene that only appears in the first image 710 but not in the second image 720. This area 712 is called a non-overlapping area in the first image 710. An area 713 on the right of the first image 710 is a portion of the scene that appears in both the first image 710 and the second image 720. This area is called an overlapping area in the first image 710. A boundary 715 demarcates the overlapping area 712 and non-overlapping area 713 in the first image 710.

An area 723 on the right of the second image 720 only appears in the second image 720, but not in the first image 710. This area 723 is called a non-overlapping area in the second image 720. An area 722 on the left of the second image 720 appears in both the first image 710 and the second image 720. This area is called an overlapping area in the second image 720. A boundary 725 demarcates the overlapping area 722 and non-overlapping area 723 in the second image 720.

The overlapping area 713 in the first image 710 and the overlapping area 722 in the second image 720 are different, due to different positions of the lens of the camera 100 when the first image 710 and the second image 720 are captured. Thus, objects in the scene captured in the overlapping area 713 and the overlapping area 722 may appear different due to the different positions of the lens of the camera 100 when the first image 710 and the second image 720 were captured.

A brightness difference is calculated between the overlapping area 713 in the first image 710 and the overlapping area 722 in the second image 720. The brightness difference is shown as image 730 in FIG. 7B. The greedy grey-weighted distance transform is applied on the brightness difference 730 to form a cost image. A path 735 is the minimum cost path. The detail of this step will be described with reference to FIG. 8. An area 732 of the brightness difference image 730 on the left of the boundary 735 uses the area in the first image 710. An area 733 of the brightness difference image 730 on the right of the boundary 735 uses all of the area in the second image 720.

FIG. 7C shows a panoramic image 740 composed using the areas 732 and 733. The panoramic image 740 includes a left area 742 and a right area 743. The left area 742 comes from the first image 710 and the right area 743 comes from second image 720, wherein the left area 742 and the right area 743 are joined by the minimum cost path 735.

The minimum seam cut is performed by applying the greedy grey-weighted distance transform to generate a cost image. The value on each location of the cost image represents the cost of a minimum cost path from top border to the current pixel. The greedy grey-weighted distance transform requires two passes over the cost image. The two passes are a forward pass and a backward pass. A forward pass is applied to a row first and a backward pass is executed immediately after the forward pass finishes on the row. The forward pass uses the chamfer distance transform, while the background pass propagates distance from only one future neighbour on the same scan-line. As a result, if the scan-line is buffered in memory, the greedy grey-weighted distance transform effectively requires only one pass over the cost image.

FIG. 8 illustrates the greedy grey-weighted distance transform given two scan lines 810 from the brightness difference 730. Each scan line is a row of visual elements, such as pixels, of an input image. The calculation starts with the forward pass first. In the forward pass, when calculating the cost of each position, (x, y), the costs of the four neighbouring locations of (x, y) are used. The four neighbouring locations of (x, y) are (x−1, y−1), (x, y−1), (x+1, y−1), and (x−1, y). For example, in FIG. 8, when calculating the cost of the location 825, $(x_1, y_1)$, the cost of the three locations above, $(x_1−1, y_1−1)$ 821, $(x_1, y_1−1)$ 822, and $(x_1+1, y_1−1)$ 823, and the location on the left, $(x_1−1, y_1)$ 824, are used. The cost is calculated as shown in Eq. (3), $$d(x_1, y_1) = \min \begin{pmatrix} d(x_1-1, y_1-1) + b \cdot f(x_1, y_1), \\ d(x_1, y_1-1) + a \cdot f(x_1, y_1), \\ d(x_1+1, y_1-1) + b \cdot f(x_1, y_1), \\ d(x_1-1, y_1) + a \cdot f(x_1, y_1) \end{pmatrix} \quad \text{Eq. (3)}$$

In one embodiment, a=0.9619, b=1.3604 and $f(x_1, y_1)$ is the value at location $(x_1, y_1)$ of the cost image 730.

After the forward pass is performed for one row, the backward pass is then applied to the row. Different from the forward pass, the backward pass only uses the cost of the location on the right of the location being considered. For example, in FIG. 8, calculating the cost of location $(x_2, y_2)$ 822, the process uses the cost of location $(x_2+1, y_2)$ 831. The cost of location $(x_2, y_2)$ 822 is calculated as shown in Eq. (4), $$d(x_2, y_2) = \min(d(x_2+1, y_2) + a \cdot f(x_2, y_2), d(x_2, y_2)) \quad \text{Eq. (4)}$$

In one embodiment, a is the same as used in Eq. (3) and $f(x_2, y_2)$ is the value at location $(x_2, y_2)$ of the cost image 730.

The disclosed method can be sped up further using hierarchical min-cut optimisation. In one embodiment, a pyramid is constructed on the cost image using blocking summing. A minimum path is then computed from the coarsest pyramid level using the disclosed minimum seam cut technique. For subsequent pyramid levels, the lower resolution path from a previous layer is refined to a finer resolution at the current layer. In one embodiment, this is done by propagating distance within the area of a thin strip, say 5-pixels thick, along the min-path of the previous layer. Since the distance propagation is done over a much smaller area compared to a full image, the cost of path refinement at higher pyramid levels is almost negligible.

Note that the final min-cut follows roughly the same path of the min-cuts at lower resolutions. Minimum cut at a lower resolution is actually desirable because it is less likely to follow thin structures in the original image. A minimum path along a static lamppost, for example, can cut moving cars behind the lamppost into two portions and leave a half-cut car on the panorama after stitching.

Extension

The global shift estimation can be improved to be robust to moving objects by using only background portions of an image for alignment. That is, portions of an image that correspond to foreground objects are excluded when estimating alignment between two images and the remainder of the image, corresponding to the background, is utilised in estimating the alignment. Foreground objects may move between images and introduce errors. Excluding regions of an image relating to moving objects during the image projection 320, 330 can avoid corruption to the global correlation caused by moving objects.

In one embodiment of detecting background, object detection results from one or more previous frames are used. In one arrangement, an initial frame is used as a reference frame, wherein the initial frame has a very simple background model which is known to be empty from moving objects. Each succeeding frame is subtracted from the reference frame, and the difference is thresholded. Differences greater or equal to the threshold, say an intensity of 128, are detected (classified) as foreground. Differences lower than the threshold are considered to be background. In another arrangement, the visual information in succeeding frames is modelled in multiple modes for each visual element. The complete model is generally known as a background model, even though the complete model models foreground as well as background. For this reason, the term "scene model" is used as well. A mode model corresponding to a visual element from the input frame records temporal characteristics, such as a hit count and a creation date, which are updated each time a new input frame's visual element is matched to the mode model. Based on the temporal characteristics, a mode model and the corresponding visual element in the input frame are classified as foreground if a temporal characteristic, say number of frames since creation date, is lower than a threshold, say 200 frames. Otherwise, the visual element is classified as background.

The detected foreground is masked out of the image, and only the remainder of the image corresponding to detected background is used for alignment. As objects may be moving from frame to frame, and the succeeding frames may be misaligned, the masking is not always accurate. The detected background may still include moving foreground objects. However, the impact of moving objects on the global shift estimation is reduced. In another embodiment of detecting background, object detection results from the previous frame are utilised with a dilation operator. For example, this embodiment can be used when the movement speed of moving objects is available but the moving direction of the moving objects is unknown. Since the object detection results are from the previous frame, the dilation operator can include the area that the moving objects occupy in the current frame. In one arrangement, the dilation size is fixed, say 9 pixels. In another arrangement, the dilation size is determined by the corresponding moving speed of the moving objects. If the object is moving at a number of pixels per frame, for example 5 pixels per frame, the dilation size is that same number of pixels plus an error margin, say 2 pixels, adding up to a 7 pixel dilation size. In another embodiment, when the moving speed of the moving objects as well as the moving direction of the moving objects is available, a dilation operator is used on one side where the moving objects are moving to and an erosion operator is used on the other side where the moving objects are moving away from. The dilation and erosion sizes are determined by the corresponding moving speed of the moving objects. As the global shift estimation still requires sufficient visual information, the masking out of information is bounded by a maximum, such that a percentage of the frame, say 10%, is still available.

After the moving objects are detected and masked out from the frames, the remaining areas in the frames are expected to be static background only. The projections are obtained 230, 240 by using these static background only.

Based on the shift estimation, either the background model can be shifted to be aligned with the input image, or the input image can be shifted to be aligned with the background model.

Sweeping Panorama Application

One embodiment provides an application for creating panoramic images. The embodiment is able to stitch live images captured by a panning camera 100. It will be appreciated that the embodiment is equally able to stitch images retrieved from a storage medium or a combination of live and retrieved images. In one arrangement, the images are automatically downloaded from a camera 100 via a USB cable connected to communications interface 193. One or more parameters or settings of the camera 100 are able to be controlled through a Software Development Kit (SDK). In another arrangement, the method is implemented on the camera and the stitched image is saved in a memory 170 of the camera 100 or on a memory card. In one arrangement, it takes one second on average to process a 1936×1288 input frame, which is near real-time.

In one embodiment, not all of the captured images are used for panorama stitching. This is done for efficiency purposes. Thus, a subset of the captured images are utilised for panorama stitching. Images whose fields of view are covered by neighbouring frames can be skipped to reduce the seam computations. All incoming frames still need to be aligned to determine the respective overlapping areas. In one arrangement, the first frame is always used in the panorama. A subsequent frame is skipped if the subsequent frame overlaps more than a percentage $p_1$, say 75%, with the last used frame and if the next frame also overlaps more than a percentage $p_2$, say 30%, with the last used frame. The second condition ensures no coverage gap is created by the removal of a frame. In another arrangement, this overlapping parameter can be increased to allow more frames to be used during stitching, $p_1=75\%$ and $p_2=1-p_1=25\%$ produce acceptable results in most cases.

In the application embodiment, consecutive image pairs are aligned as the images are read off the camera. After the alignment finishes, the application determines the bounding box of the panorama and locations of individual frames within this bounding box. Because the image locations are calculated from a cumulative sum of consecutive image translations, a single incorrect shift can break the geometric flow of the whole panorama. Thanks to a 1D constraint of the sweeping motion, motion prediction is used to crop the current frame and a next successive frame to improve the overlap of the current frame and the next successive frame prior to alignment. This improves the robustness of the projection-based shift estimation of the present disclosure.

In other existing approaches, the panorama feature requires the user to select the sweep direction before capturing images. In contrast, the method of the present disclosure determines the sweep direction automatically from the alignment result.

Evaluation

The multi-hypothesis projection-based shift estimation method of the present disclosure is compared against the FFT-based 2D correlation approach and the projection-based correlation approach. The three algorithms were implemented in Matlab™ R2010b. The images were subsampled to 320×240 prior to applying the projection-based correlation approach. Harris corner detection followed by nearest neighbour corner matching was implemented for the projection-based correlation approach to detect small rotation and scale change.

The three approaches were applied to panning image pairs of different sizes and the execution time in Matlab™ R2010b was recorded. Runtime varies even for the same image size, due to different content overlaps. All approaches show a linear run-time performance with respect to the number of input pixels. FFT-based 2D correlation, however, is the slowest approach. The floating-point FFT operation of FFT-based 2D correlation triggers an out-of-memory error for images larger than 10 MP. The multi-hypothesis projection-based shift estimation approach runs slightly faster than that of projection-based correlation approach, because the disclosed multi-hypothesis projection-based shift estimation approach does not have the corner detection and matching steps. The disclosed multi-hypothesis projection-based shift estimation approach takes less than 0.05 of a second in Matlab™ R2010b to align a one Mega-Pixel (1 MP) image pair and roughly 0.1 second to align an 8 MP image pair. As the image size gets larger, the major part of the run-time is spent on image subsampling. In one arrangement, image subsampling is implemented in hardware using CCD binning, for efficiency.

To measure the robustness of the disclosed approach against large translation, a synthetic shift experiment is performed. Two 512×340 images are cropped from a 1119×353 panoramic image such that the two images are related by a purely horizontal translation, which ranges from 1 to 500 pixels. Both FFT-based 2D correlation and projection-based correlation approaches fail to estimate shifts larger than 128 pixels (i.e., $t_x>25\%$ of image width). On the other hand, the disclosed multi-hypothesis projection-based approach estimates both shift components correctly for a synthetic translation up to 456 pixels (i.e., 90% of image width). This is because the strongest correlation peak does not always correspond to the true shift. Large non-overlapping areas can alter the correlation surface, leading to a sudden switch of the global peak to a different location.

Table 1 shows an average accuracy of the three approaches. The measurement used is the Root Mean Squared Errors (RMSE) of the estimated shifts within two ground-truth translation intervals. The first interval ($1 \leq t_x \leq 128$) is where all three approaches achieve subpixel accuracy. Within this interval, the projection-based correlation approach is the most accurate and the disclosed approach is the least accurate. The second interval covers a larger range of shifts ($1 \leq t_x \leq 456$) and this is when all other approaches except the disclosed approach show a high error. The disclosed algorithm produces an average of alignment error of only 2 pixels for horizontal translations up to 90% of the image width.

TABLE 1

RMSE of estimated shifts under large translation (in pixels)

|  | FFT-based 2D Correlation | Projection-based Correlation | Multi-hypothesis Projection-based |
|---|---|---|---|
| $1 \leq t_x \leq 128$ | 0.118 | 0.083 | 0.420 |
| $1 \leq t_x \leq 456$ | 278.444 | 279.549 | 2.281 |

The robustness of the disclosed approach is also tested against small image rotation. The three approaches are applied on purely rotated image pairs. The images are generated from one image by a rotation, followed by central cropping to 276×448 pixels to remove regions of missing content. Under zero translation, the projection-based correlation approach is robust up to 3° rotation. Outside this ±3° rotation range, however, the projection-based approach produces unreliably large shift estimation errors. The disclosed multi-hypothesis projection-based shift estimation approach performs equally well to that of projection-based correlation approach for small rotation ($\theta<3°$). For a larger rotation, the error of the disclosed approach increases gradually, reaching 10-pixel misalignment for 10° rotation.

The performances of the three approaches under image rotation are further described by the RMSEs in Table 2.

TABLE 2

| RMSE of estimated shifts under small rotation (in pixels) | | | |
| --- | --- | --- | --- |
| | FFT-based 2D Correlation | Projection-based Correlation | Multi-hypothesis Projection-based |
| −1° ≤ θ ≤ 1° | 1.070 | 0.673 | 0.737 |
| −3° ≤ θ ≤ 3° | 3.212 | 1.684 | 1.310 |
| −5° ≤ θ ≤ 5° | 5.481 | 141.555 | 1.679 |

Within a ±1° rotation range, the projection-based correlation approach is the most accurate method, closely followed by the disclosed approach; both achieve subpixel accuracy. For any larger rotation range, the disclosed approach is the most accurate, which consistently produce less than 2-pixel alignment error for rotation up to 5°. The projection-based correlation approach, on the other hand, fails to align images under more than 3° rotation.

CONCLUSIONS

The present disclosure provides one or more embodiments for sweeping panorama reconstruction from images taken by a panning camera. The embodiments include a multi-hypothesis projection-based image alignment step, a minimum seam detection step, and an optional multi-scale blending step. The disclosed multi-hypothesis projection-based shift estimation approach is fast and robust to large image translations in either x- or y-direction. The seam detection algorithm is also fast due to a hierarchical implementation of min-cut and a greedy grey-weighted distance propagation. The Laplacian pyramid blending process is optionally used to eliminate any remaining intensity mismatch after stitching.

This disclosed multi-hypothesis projection-based shift estimation approach has a number of advantages over existing arrangements. It is a lightweight solution suitable for embedded devices. Compared to other embedded solutions, the disclosed multi-hypothesis projection-based shift estimation approach is more robust to non-purely translational motion (e.g., projective distortion), moving objects and camera motion blur.

INDUSTRIAL APPLICABILITY

The arrangements described are applicable to the computer and data processing industries and particularly for image processing and surveillance industries.

The foregoing describes only some embodiments of the present invention, and modifications and/or changes can be made thereto without departing from the scope and spirit of the invention, the embodiments being illustrative and not restrictive.

The invention claimed is:

1. A method of determining a shift between a first image and a second image, the first image having first image projection characteristics and the second image having second image projection characteristics, said method comprising:
    determining a first correlation in a first direction, said first correlation being derived from the first image projection characteristics in the first direction and the second image projection characteristics in the first direction;
    determining a second correlation in a second direction, said second correlation being derived from the first image projection characteristics in the second direction and the second image projection characteristics in the second direction;
    identifying a first plurality of local maxima in the first correlation in the first direction;
    identifying a second plurality of local maxima in the second correlation in the second direction;
    determining a set of hypotheses, wherein each hypothesis in said set of hypotheses is a combination of one of the identified first plurality of local maxima and one of the identified second plurality of local maxima; and
    determining the shift between the first image and the second image based upon the set of hypotheses by:
        calculating a two-dimensional correlation score between the first image and the second image based on a shift indicated in at least one of the set of hypotheses; and
        selecting one of the set of hypotheses as the shift between the first image and the second image based on the calculated two-dimensional correlation score.

2. The method according to claim 1, wherein the first image projection characteristics relate to at least one of gradient magnitude, intensity, and DCT blocks.

3. The method according to claim 1, wherein the second image projection characteristics relate to at least one of gradient magnitude, intensity, and DCT blocks.

4. The method according to claim 1, wherein said first image projection characteristics and said second image projection characteristics are the same type.

5. The method according to claim 1, wherein determining the shift between the first image and the second image based upon the set of hypotheses comprises the steps of:
    calculating a two-dimensional Normalised Cross-Correlation (2D NCC) score for each hypothesis in the set of hypotheses; and
    selecting the hypothesis with the highest 2D NCC score as the shift between the first and the second images.

6. The method according to claim 1, comprising the further step of stitching together a first portion of the first image and a second portion of the second image to form a panoramic image, based upon said determined shift.

7. The method according to claim 1, wherein the determined shift is used to shift a background model in the first image such that the background model is aligned with the second image.

8. The method according to claim 7, wherein visual elements in the second image are classified as one of foreground or background by comparing the second image to the background model.

9. The method according to claim 1, wherein the determined shift is used to shift the second image such that the second image is aligned with a background model corresponding to the first image.

10. The method according to claim 9, wherein visual elements in the second image are classified as one of foreground or background by comparing the second image to the background model.

11. The method according to claim 1, further comprising the step of masking out part of the first image and masking out part of the second image prior to determining the projection characteristics, and wherein the projection characteristics are determined on the remainder of the first image and the remainder of the second image.

12. The method according to claim 1, wherein the first direction is the x-axis of the respective first and second images and the second direction is the y-axis of the respective first and second images.

13. The method according to claim 1, wherein the first direction and the second direction are orthogonal to one another.

14. An image processing system comprising:
a lens system;
a sensor;
a control module for controlling said lens system and said sensor to capture an image sequence of a scene;
a storage device for storing a computer program; and
a processor for executing the program,
said program comprising computer program code for determining a shift between a first image and a second image of the image sequence, the first image having first image projection characteristics and the second image having second image projection characteristics, the code including:
  code for determining a first correlation in a first direction, said first correlation being derived from the first image projection characteristics in the first direction and the second image projection characteristics in the first direction;
  code for determining a second correlation in a second direction, said second correlation being derived from the first image projection characteristics in the second direction and the second image projection characteristics in the second direction;
  code for identifying a first plurality of local maxima in the first correlation in the first direction;
  code for identifying a second plurality of local maxima in the second correlation in the second direction;
  code for determining a set of hypotheses, wherein each hypothesis in said set of hypotheses is a combination of one of the identified first plurality of local maxima and one of the identified second plurality of local maxima;
  code for calculating a two-dimensional correlation score between the first image and the second image based on a shift indicated in at least one of the set of hypotheses; and
  code for selecting one of the set of hypotheses as the shift between the first image and the second image based on the calculated two-dimensional correlation score.

15. The image processing system according to claim 14, wherein said image processing system is a camera.

16. The image processing system according to claim 14, wherein said image processing system further comprises:
  a camera comprising each of said lens system, said sensor and said control module; and
  a computer module coupled to said camera, said computer module comprising said storage device and said processor.

17. A computer readable storage medium having recorded thereon a computer program for determining a shift between a first image and a second image, the first image having first image projection characteristics and the second image having second image projection characteristics, said computer program comprising:
  code for determining a first correlation in a first direction, said first correlation being derived from the first image projection characteristics in the first direction and the second image projection characteristics in the first direction;
  code for determining a second correlation in a second direction, said second correlation being derived from the first image projection characteristics in the second direction and the second image projection characteristics in the second direction;
  code for identifying a first plurality of local maxima in the first correlation in the first direction;
  code for identifying a second plurality of local maxima in the second correlation in the second direction;
  code for determining a set of hypotheses, wherein each hypothesis in said set of hypotheses is a combination of one of the identified first plurality of local maxima and one of the identified second plurality of local maxima;
  code for calculating a two-dimensional correlation score between the first image and the second image based on a shift indicated in at least one of the set of hypotheses; and
  code for selecting one of the set of hypotheses as the shift between the first image and the second image based on the calculated two-dimensional correlation score.

18. A method of determining a shift between a first image and a second image, the first image having first image projection characteristics and the second image having second image projection characteristics, said method comprising:
  determining a first correlation in a first direction, said first correlation being derived from the first image projection characteristics in the first direction and the second image projection characteristics in the first direction;
  determining a second correlation in a second direction, said second correlation being derived from the first image projection characteristics in the second direction and the second image projection characteristics in the second direction;
  identifying a first plurality of local maxima in the first correlation in the first direction;
  identifying a second plurality of local maxima in the second correlation in the second direction; and
  determining the shift between the first image and the second image by:
    determining an hypothesis that satisfies a predetermined threshold, said hypothesis including a local maxima of the first correlation and a local maxima of the second correlation; and
    selecting said determined hypothesis as the shift between the first image and the second image.

19. The method according to claim 18, wherein said step of determining an hypothesis that satisfies a predetermined threshold includes:
  iteratively selecting permutations of a local maxima of the first correlation and a local maxima of the second correlation as a present hypothesis; and
  comparing said present hypothesis to said predetermined threshold.

20. A method of determining a shift between a first image and a second image, the first image having first image projection characteristics and the second image having second image projection characteristics, said method comprising:
  determining a first correlation in a first direction, said first correlation being derived from the first image projection characteristics in the first direction and the second image projection characteristics in the first direction;
  determining a second correlation in a second direction, said second correlation being derived from the first image projection characteristics in the second direction and the second image projection characteristics in the second direction;
  identifying a first plurality of local maxima in the first correlation in the first direction;
  identifying a second plurality of local maxima in the second correlation in the second direction;
  determining a set of hypotheses, wherein each hypothesis in said set of hypotheses is a combination of one of the identified first plurality of local maxima and one of the identified second plurality of local maxima; and determining the shift between the first image and the second image based upon the set of hypotheses.

21. A non-transitory computer readable storage medium having a program recorded thereon, the program being executable by a processor to determine a shift between a first image and a second image, the first image having first image projection characteristics and the second image having second image projection characteristics, said program comprising:
- code for determining a first correlation in a first direction, said first correlation being derived from the first image projection characteristics in the first direction and the second image projection characteristics in the first direction;
- code for determining a second correlation in a second direction, said second correlation being derived from the first image projection characteristics in the second direction and the second image projection characteristics in the second direction;
- code for identifying a first plurality of local maxima in the first correlation in the first direction;
- code for identifying a second plurality of local maxima in the second correlation in the second direction;
- code for determining a set of hypotheses, wherein each hypothesis in said set of hypotheses is a combination of one of the identified first plurality of local maxima and one of the identified second plurality of local maxima; and
- code for determining the shift between the first image and the second image based upon the set of hypotheses.

* * * * *